US012751497B2

(12) United States Patent
Moloney et al.

(10) Patent No.: US 12,751,497 B2
(45) Date of Patent: Oct. 6, 2026

(54) APPARATUS FOR AN AEROSOL GENERATING DEVICE

(71) Applicant: Nicoventures Trading Limited, London (GB)

(72) Inventors: Patrick Moloney, London (GB); Anton Korus, London (GB); Justin Han Yang Chan, London (GB)

(73) Assignee: NICOVENTURES TRADING LIMITED, London (GB)

( * ) Notice: Subject to any disclaimer, the term of this patent is extended or adjusted under 35 U.S.C. 154(b) by 952 days.

(21) Appl. No.: 17/905,577

(22) PCT Filed: Mar. 4, 2021

(86) PCT No.: PCT/GB2021/050542
§ 371 (c)(1),
(2) Date: Sep. 2, 2022

(87) PCT Pub. No.: WO2021/176224
PCT Pub. Date: Sep. 10, 2021

(65) Prior Publication Data

US 2023/0127267 A1 Apr. 27, 2023

(30) Foreign Application Priority Data

Mar. 4, 2020 (GB) ...................................... 2003131

(51) Int. Cl.

| | |
|---|---|
| ***A24F 40/57*** | (2020.01) |
| ***A24F 40/465*** | (2020.01) |
| ***A24F 40/51*** | (2020.01) |
| ***G01K 7/00*** | (2006.01) |
| ***H02M 1/00*** | (2006.01) |
| ***H02M 3/00*** | (2006.01) |
| ***H02M 3/158*** | (2006.01) |

(Continued)

(52) U.S. Cl.
CPC ............ *A24F 40/57* (2020.01); *A24F 40/465* (2020.01); *A24F 40/51* (2020.01); *G01K 7/00* (2013.01); *H02M 1/0048* (2021.05); *H02M 3/01* (2021.05); *H02M 3/158* (2013.01); *H05B 6/06* (2013.01); *H05B 6/105* (2013.01); *G01K 2217/00* (2013.01)

(58) Field of Classification Search
None
See application file for complete search history.

(56) References Cited

FOREIGN PATENT DOCUMENTS

WO WO-2018178113 A2 10/2018
WO WO-2018195335 A1 10/2018
(Continued)

OTHER PUBLICATIONS

International Search Report and Written Opinion for Application No. PCT/GB2021/050542 mailed on Jun. 14, 2021, 16 pages.

*Primary Examiner* — Katherine A Will
(74) *Attorney, Agent, or Firm* — BURR & FORMAN

(57) ABSTRACT

An apparatus for an aerosol generating device includes a heating circuit including an inductive element for inductively heating a susceptor arrangement to heat an aerosol generating material to thereby generate an aerosol, a temperature determiner for determining a temperature of the susceptor arrangement based on one or more electrical properties of the heating circuit influenced by the temperature of the susceptor arrangement, and a control arrangement. Aerosol generating systems and methods of operating an aerosol generating system are also provided.

20 Claims, 11 Drawing Sheets

(51) Int. Cl.
*H05B 6/06* (2006.01)
*H05B 6/10* (2006.01)

(56) References Cited

FOREIGN PATENT DOCUMENTS

WO WO-2019002613 A1 1/2019
WO WO-2020020970 A1 1/2020

APPARATUS FOR AN AEROSOL GENERATING DEVICE

PRIORITY CLAIM

The present application is a National Phase entry of PCT Application No. PCT/GB2021/050542, filed Mar. 4, 2021, which claims priority from GB Application No. 2003131.6, filed Mar. 4, 2020, each of which is hereby fully incorporated herein by reference.

TECHNICAL FIELD

The present disclosure relates to apparatus for an aerosol-generating device, in particular, apparatus comprising a temperature determiner for determining a temperature of a susceptor arrangement arranged to be inductively heated and to heat an aerosol generating material to generate an aerosol.

BACKGROUND

Smoking articles such as cigarettes, cigars and the like burn tobacco during use to create tobacco smoke. Attempts have been made to provide alternatives to these articles by creating products that release compounds without combusting. Examples of such products are so-called “heat not burn” products or tobacco heating devices or products, which release compounds by heating, but not burning, material. The material may be, for example, tobacco or other non-tobacco products, which may or may not contain nicotine.

SUMMARY

According to a first aspect of the present disclosure there is provided apparatus for an aerosol generating device, the apparatus comprising: a heating circuit comprising an inductive element for inductively heating a susceptor arrangement to heat an aerosol generating material to thereby generate an aerosol; a temperature determiner for determining a temperature of the susceptor arrangement based on one or more electrical properties of the heating circuit influenced by the temperature of the susceptor arrangement; and a control arrangement configured to cause the heating circuit to operate in: an operational mode in which the heating circuit is supplied with a first voltage to inductively heat the susceptor arrangement to generate an aerosol for inhalation by a user; and a temperature determination mode in which the heating circuit is supplied with a continuous second voltage which is different to the first voltage, wherein in the temperature determination mode the heating circuit is configured to impart energy via induction to the heating circuit without significantly heating the susceptor arrangement and the temperature determiner is configured to determine the temperature of the susceptor arrangement based on the one or more electrical properties of the heating circuit.

The one or more electrical properties of the heating circuit may comprise a frequency at which the circuit is operating and/or a current drawn by the heating circuit and/or an impedance of the heating circuit.

The second voltage may be a substantially constant DC voltage.

The apparatus may comprise a voltage regulator, wherein the voltage regulator is operable to cause the second voltage to be supplied to the heating circuit in the temperature determination mode and/or the first voltage to be supplied to the heating circuit in the operational mode.

In the operational mode, the voltage supplied to the heating circuit may be not regulated by the voltage regulator.

The voltage regulator may be configured to allow an input voltage from a DC voltage supply to be stepped down to output a DC voltage across the heating circuit which has a lower magnitude than the input voltage.

The control arrangement may be configured to control the voltage output by the voltage regulator by controlling a property of the input voltage from the DC voltage supply to the voltage regulator.

The property of the input voltage from the DC voltage supply to the voltage regulator may be a duty cycle of the input voltage.

The heating circuit may be a resonant LC circuit.

The heating circuit may be a parallel LC circuit comprising a capacitive element arranged in parallel with the inductive element.

The LC resonant circuit may be configured to operate at a resonant frequency of the LC resonant circuit to heat the susceptor arrangement.

The switching arrangement may be configured to alternate between a first state and a second state to cause the varying current through the inductive element. The switching arrangement may be configured to alternate between the first state and the second state in response to voltage oscillations within the resonant circuit.

The voltage oscillations within the resonant circuit may act to cause the alternating of the switching arrangement between the first state and the second state to thereby cause the current through the inductive element to vary at the resonant frequency of the resonant circuit.

The second voltage may be lower than the first voltage. The first voltage is may be in the range 3V-5V, for example around 4V. The second voltage may be in the range 1V-3V, for example around 2V.

The temperature determiner may be configured to, in the temperature sensing mode, determine a temperature of the susceptor arrangement based on a frequency that the heating circuit is being operated at and a DC current drawn by the heating circuit.

The temperature determiner may be configured to, in the temperature sensing mode, determine a temperature of the susceptor arrangement based on, in addition to the frequency that the heating circuit is being operated at and the DC current drawn by the heating circuit, the second voltage supplied to the circuit.

The temperature determiner may be configured to, in the temperature sensing mode: determine an effective grouped resistance of the inductive element and the susceptor arrangement from the frequency that the heating circuit is being operated at, the DC current drawn by the heating circuit and the second voltage; and determine the temperature of the susceptor arrangement based on the determined effective grouped resistance.

According to a second aspect of the present disclosure there is provided apparatus for an aerosol generating device, the apparatus comprising: a heating circuit comprising: a first inductive element for inductively heating a susceptor arrangement to heat an aerosol generating material to thereby generate an aerosol; a temperature sensing circuit comprising: a second inductive element arranged to be inductively coupled to the susceptor arrangement and arranged to inductively impart energy from the second inductive element to the susceptor arrangement without significantly heating the susceptor arrangement; and a temperature determiner configured to determine a temperature of the susceptor arrangement based on one or more electrical properties of the temperature sensing circuit.

The apparatus may comprise a control arrangement configured to cause the apparatus to selectively operate in: an operational mode in which the heating circuit is operable to inductively heat the susceptor arrangement to generate an aerosol for inhalation by a user; and a temperature determination mode in which the temperature sensing circuit is operable to inductively impart energy to the susceptor arrangement and the temperature determiner is operable to determine the temperature of the susceptor arrangement and in which the heating circuit is not operable to heat the susceptor arrangement to generate an aerosol for inhalation by the user.

The one or more electrical properties of the temperature sensing circuit may comprise a frequency at which the temperature sensing circuit is operating and/or a current drawn by the temperature sensing circuit and/or an impedance of the temperature sensing circuit.

In the operational mode, the heating circuit may be supplied with a first DC voltage to cause the heating circuit to heat the susceptor arrangement. In the temperature-sensing mode, the temperature sensing circuit may be supplied with a second continuous DC voltage, different to the first DC voltage, to cause the temperature sensing circuit to inductively impart energy to the susceptor arrangement and to allow the temperature determiner to determine the temperature of the susceptor arrangement.

The second voltage may be a substantially constant DC voltage.

The second voltage may be lower than the first voltage. The first voltage may be in the range 3V-5V, for example around 4V. The second voltage may be in the range 1V-3V, for example around 2V.

The temperature sensing circuit may comprise an LC resonant circuit comprising the second inductive element; and a switching arrangement configured to cause a varying current to be generated from a DC supply voltage and flow through the second inductive element to cause energy to be imparted inductively from the second inductive element to the susceptor arrangement.

The heating circuit may be a parallel LC circuit comprising a capacitive element arranged in parallel with the second inductive element.

The LC resonant circuit may be configured to operate at a resonant frequency of the LC resonant circuit to heat the susceptor arrangement.

The switching arrangement may be configured to alternate between a first state and a second state to cause the varying current through the second inductive element. The switching arrangement may be configured to alternate between the first state and the second state in response to voltage oscillations within the resonant circuit.

The voltage oscillations within the resonant circuit may act to cause the alternating of the switching arrangement between the first state and the second state to thereby cause the current through the second inductive element to vary at the resonant frequency of the resonant circuit.

The temperature sensing circuit may comprise: a voltage regulator configured to receive an input voltage from a DC voltage supply and output the DC voltage across the temperature sensing circuit to cause the second inductive element of the temperature sensing circuit to inductively impart energy to the susceptor arrangement.

The heating circuit may comprise: a voltage regulator configured to receive an input voltage from a DC voltage supply and output the DC voltage across the heating circuit to cause the first inductive element of the heating circuit to heat the susceptor arrangement to thereby generate an aerosol for inhalation by the user.

According to a third aspect of the present disclosure there is provided an aerosol-generating device comprising the apparatus according to the first aspect or the apparatus according to the second aspect.

According to a fourth aspect of the present disclosure there is provided an aerosol generating system comprising the aerosol generating device according to the third aspect and a susceptor arrangement arranged to be heated by the first inductive element to thereby heat the aerosol generating material to generate a flow of aerosol and arranged to be inductively coupled to the second inductive element such that the temperature determiner can be operated to determine a temperature of the susceptor arrangement.

The susceptor arrangement may be provided in a component separate from, and configured to releasably engage with, the aerosol provision device.

According to a fifth aspect of the present disclosure there is provided a method of operating an aerosol generating system comprising an aerosol generating device and a susceptor arrangement arranged to be heated by the aerosol generating device to heat aerosol generating material to generate a flow of aerosol, wherein the aerosol generating device comprises apparatus comprising: a heating circuit comprising an inductive element for inductively heating the susceptor arrangement to heat the aerosol generating material to thereby generate an aerosol; a temperature determiner for determining a temperature of the susceptor arrangement based on one or more electrical properties of the heating circuit influenced by the temperature of the susceptor arrangement; and a control arrangement; and wherein the method comprises: controlling, by the control arrangement, the apparatus to selectively operate in: an operational mode in which the heating circuit is supplied with a first voltage to inductively heat the susceptor arrangement to generate an aerosol for inhalation by a user; and a temperature determination mode in which the heating circuit is supplied with a continuous second voltage which is different to the first voltage, wherein in the temperature determination mode the heating circuit is configured to impart energy via induction to the heating circuit without significantly heating the susceptor arrangement and the temperature determiner is configured to determine the temperature of the susceptor arrangement based on the one or more electrical properties of the heating circuit.

According to a sixth aspect of the present disclosure there is provided a method of operating an aerosol generating system comprising an aerosol generating device and a susceptor arrangement arranged to be heated by the aerosol generating device to heat aerosol generating material to generate a flow of aerosol, wherein the aerosol generating device comprises apparatus comprising: a heating circuit comprising: a first inductive element for inductively heating a susceptor arrangement to heat an aerosol generating material to thereby generate an aerosol; a temperature sensing circuit comprising: a second inductive element arranged to be inductively coupled to the susceptor arrangement and arranged to inductively impart energy from the second inductive element to the susceptor arrangement without significantly heating the susceptor arrangement; and a temperature determiner; wherein the method comprises: determining, by the temperature determiner, a temperature of the susceptor arrangement based on one or more electrical properties of the temperature sensing circuit.

BRIEF DESCRIPTION OF THE DRAWINGS

The disclosure will now be described, by way of example only, with reference to the following figures, in which.

DETAILED DESCRIPTION OF THE DRAWINGS

Figure 1:
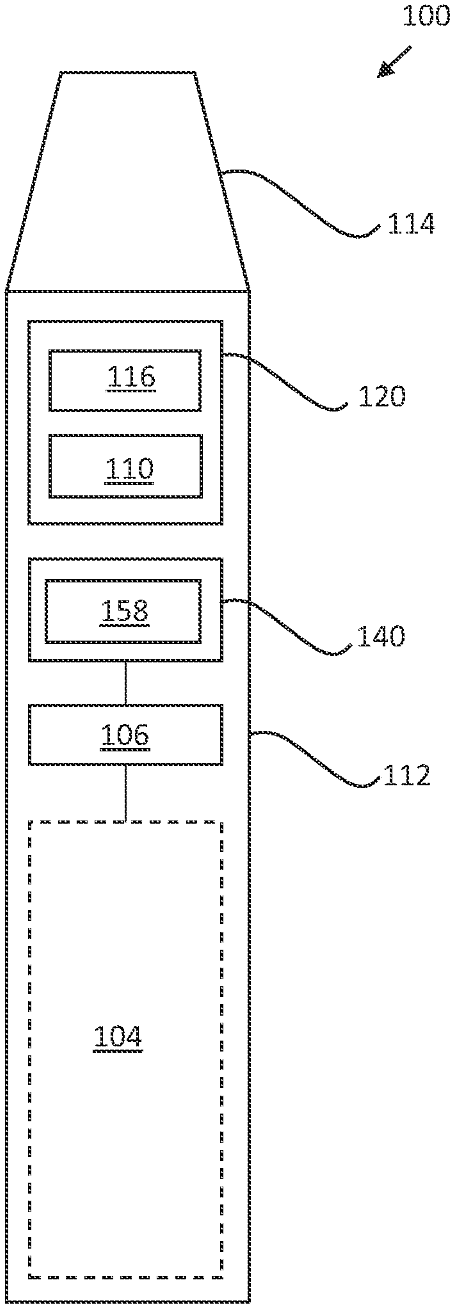
FIG. 1 illustrates schematically an aerosol-generating device according to an example.

Induction heating is a process of heating an electrically conducting object (or susceptor) by electromagnetic induction. An induction heater may comprise an inductive element, for example, an inductive coil and a device for passing a varying electric current, such as an alternating electric current, through the inductive element. The varying electric current in the inductive element produces a varying magnetic field. The varying magnetic field penetrates a susceptor suitably positioned with respect to the inductive element, generating eddy currents inside the susceptor. The susceptor has electrical resistance to the eddy currents, and hence the flow of the eddy currents against this resistance causes the susceptor to be heated by Joule heating. In cases where the susceptor comprises ferromagnetic material such as iron, nickel or cobalt, heat may also be generated by magnetic hysteresis losses in the susceptor, i.e. by the varying orientation of magnetic dipoles in the magnetic material as a result of their alignment with the varying magnetic field.

In inductive heating, as compared to heating by conduction for example, heat is generated inside the susceptor, allowing for rapid heating. Further, there need not be any physical contact between the inductive heater and the susceptor, allowing for enhanced freedom in construction and application.

An induction heater may comprise an LC circuit, having an inductance L provided by an induction element, for example the electromagnet which may be arranged to inductively heat a susceptor, and a capacitance C provided by a capacitor. The circuit may in some cases be represented as an RLC circuit, comprising a resistance R provided by a resistor. In some cases, resistance is provided by the ohmic resistance of parts of the circuit connecting the inductor and the capacitor, and hence the circuit need not necessarily include a resistor as such. Such a circuit may be referred to, for example as an LC circuit. Such circuits may exhibit electrical resonance, which occurs at a particular resonant frequency when the imaginary parts of impedances or admittances of circuit elements cancel each other.

One example of a circuit exhibiting electrical resonance is an LC circuit, comprising an inductor, a capacitor, and optionally a resistor. One example of an LC circuit is a series circuit where the inductor and capacitor are connected in series. Another example of an LC circuit is a parallel LC circuit where the inductor and capacitor are connected in parallel. Resonance occurs in an LC circuit because the collapsing magnetic field of the inductor generates an electric current in its windings that charges the capacitor, while the discharging capacitor provides an electric current that builds the magnetic field in the inductor. Certain examples in the present disclosure include parallel LC circuits. When a parallel LC circuit is driven at the resonant frequency, the dynamic impedance of the circuit is at a maximum (as the reactance of the inductor equals the reactance of the capacitor), and circuit current is at a minimum. However, for a parallel LC circuit, the parallel inductor and capacitor loop acts as a current multiplier (effectively multiplying the current within the loop and thus the current passing through the inductor). Driving the RLC or LC circuit at or near the resonant frequency may therefore provide for effective and/or efficient inductive heating by providing for the greatest value of the magnetic field penetrating the susceptor.

A transistor is a semiconductor device for switching electronic signals. A transistor typically comprises at least three terminals for connection to an electronic circuit. In some prior art examples, an alternating current may be supplied to a circuit using a transistor by supplying a drive signal which causes the transistor to switch at a predetermined frequency, for example at the resonant frequency of the circuit.

A field effect transistor (FET) is a transistor in which the effect of an applied electric field may be used to vary the effective conductance of the transistor. The field effect transistor may comprise a body B, a source terminal S, a drain terminal D, and a gate terminal G. The field effect transistor comprises an active channel comprising a semiconductor through which charge carriers, electrons or holes, may flow between the source S and the drain D. The conductivity of the channel, i.e. the conductivity between the drain D and the source S terminals, is a function of the potential difference between the gate G and source S terminals, for example generated by a potential applied to the gate terminal G. In enhancement mode FETs, the FET may be OFF (i.e. substantially prevent current from passing therethrough) when there is substantially zero gate G to source S voltage, and may be turned ON (i.e. substantially allow current to pass therethrough) when there is a substantially non-zero gate G-source S voltage.

An n-channel (or n-type) field effect transistor (n-FET) is a field effect transistor whose channel comprises an n-type semiconductor, where electrons are the majority carriers and holes are the minority carriers. For example, n-type semiconductors may comprise an intrinsic semiconductor (such as silicon for example) doped with donor impurities (such as phosphorus for example). In n-channel FETs, the drain terminal D is placed at a higher potential than the source terminal S (i.e. there is a positive drain-source voltage, or in other words a negative source-drain voltage). In order to turn an n-channel FET "on" (i.e. to allow current to pass therethrough), a switching potential is applied to the gate terminal G that is higher than the potential at the source terminal S.

A p-channel (or p-type) field effect transistor (p-FET) is a field effect transistor whose channel comprises a p-type semiconductor, where holes are the majority carriers and electrons are the minority carriers. For example, p-type semiconductors may comprise an intrinsic semiconductor (such as silicon for example) doped with acceptor impurities (such as boron for example). In p-channel FETs, the source terminal S is placed at a higher potential than the drain terminal D (i.e. there is a negative drain-source voltage, or in other words a positive source-drain voltage). In order to turn a p-channel FET "on" (i.e. to allow current to pass therethrough), a switching potential is applied to the gate terminal G that is lower than the potential at the source terminal S (and which may for example be higher than the potential at the drain terminal D).

A metal-oxide-semiconductor field effect transistor (MOSFET) is a field effect transistor whose gate terminal G is electrically insulated from the semiconductor channel by an insulating layer. In some examples, the gate terminal G may be metal, and the insulating layer may be an oxide (such as silicon dioxide for example), hence "metal-oxide-semiconductor". However, in other examples, the gate may be made from other materials than metal, such as polysilicon, and/or the insulating layer may be made from other materials than oxide, such as other dielectric materials. Such devices are nonetheless typically referred to as metal-oxide-semiconductor field effect transistors (MOSFETs), and it is to be understood that as used herein the term metal-oxide-semiconductor field effect transistors or MOSFETs is to be interpreted as including such devices.

A MOSFET may be an n-channel (or n-type) MOSFET where the semiconductor is n-type. The n-channel MOSFET (n-MOSFET) may be operated in the same way as described above for the n-channel FET. As another example, a MOSFET may be a p-channel (or p-type) MOSFET, where the semiconductor is p-type. The p-channel MOSFET (p-MOSFET) may be operated in the same way as described above for the p-channel FET. An n-MOSFET typically has a lower source-drain resistance than that of a p-MOSFET. Hence in an "on" state (i.e. where current is passing therethrough), n-MOSFETs generate less heat as compared to p-MOSFETs, and hence may waste less energy in operation than p-MOSFETs. Further, n-MOSFETs typically have shorter switching times (i.e. a characteristic response time from changing the switching potential provided to the gate terminal G to the MOSFET changing whether or not current passes therethrough) as compared to p-MOSFETs. This can allow for higher switching rates and improved switching control.

FIG. 1 illustrates schematically an aerosol-generating device 100, according to an example. The aerosol generating device 100 comprises a DC power source 104, in this example a battery 104, a susceptor arrangement 110, and circuitry 140 comprising an inductive element 158 for heating the susceptor arrangement 110. The susceptor arrangement 110 is arranged to heat an aerosol generating material 116 to thereby generate an aerosol, e.g., for inhalation by a user.

In the example of FIG. 1, the susceptor arrangement 110 is located within a consumable 120 along with the aerosol generating material 116. The DC power source 104 is electrically connected to circuitry 140 and is arranged to provide DC electrical power to the circuitry 140.

The circuitry 140 comprises a control arrangement 106 (not shown in FIG. 1) which is configured to perform the function of a temperature determiner, as will be described below, and may also perform other functions. The circuitry 140 also comprises a heating circuit 150 which comprises the inductive element 158.

The control arrangement 106 may comprise means for switching the device 100 on and off, for example in response to a user input. The control arrangement 106 may for example comprise a puff detector (not shown), as is known per se, and/or may take user input via at least one button or touch control (not shown). The control arrangement 106 may comprise means for monitoring the temperature of components of the device 100 or components of a consumable 120 inserted in the device.

The inductive element 158 may be, for example, a coil, which may, for example, be planar. The inductive element 158 may, for example, be formed from copper (which has a relatively low resistivity). The circuitry 140 is arranged to convert an input DC current from the DC power source 104 into a varying, e.g. alternating, current through the inductive element 158, as will be described below in more detail. The circuitry 140 is arranged to drive the varying current through the inductive element 158.

The susceptor arrangement 110 is arranged relative to the inductive element 158 for inductive energy transfer from the inductive element 158 to the susceptor arrangement 110. The susceptor arrangement 110 may be formed from any suitable material that can be inductively heated, for example a metal or metal alloy, e.g., steel. In some implementations, the susceptor arrangement 110 may comprise or be entirely formed from a ferromagnetic material, which may comprise one or a combination of example metals such as iron, nickel and cobalt. In some implementations, the susceptor arrangement 110 may comprise or be formed entirely from a non-ferromagnetic material, for example aluminum. The inductive element 158, having varying current driven therethrough, causes the susceptor arrangement 110 to heat up by Joule heating and/or by magnetic hysteresis heating, as described above. The susceptor arrangement 110 is arranged to heat the aerosol generating material 116, for example by conduction, convection, and/or radiation heating, to generate an aerosol in use. In some examples, the susceptor arrangement 110 and the aerosol generating material 116 form an integral unit that may be inserted and/or removed from the aerosol generating device 100, and may be disposable. In some examples, the inductive element 158 may be removable from the device 100, for example for replacement. The aerosol-generating device 100 may be hand-held.

It is noted that, as used herein, the term "aerosol generating material" includes materials that provide volatilized components upon heating, typically in the form of vapor or an aerosol. Aerosol generating material may be a non-tobacco-containing material or a tobacco-containing material. For example, the aerosol generating material may be or comprise tobacco. Aerosol generating material may, for example, include one or more of tobacco per se, tobacco derivatives, expanded tobacco, reconstituted tobacco, tobacco extract, homogenized tobacco or tobacco substitutes. The aerosol generating material can be in the form of ground tobacco, cut rag tobacco, extruded tobacco, reconstituted tobacco, reconstituted material, liquid, gel, gelled sheet, powder, or agglomerates, or the like. Aerosol generating material also may include other, non-tobacco, products, which, depending on the product, may or may not contain nicotine. Aerosol generating material may comprise one or more humectants, such as glycerol or propylene glycol.

The aerosol-generating device 100 comprises an outer body 112 which houses the DC power supply 104, and the circuitry 140 comprising the inductive element 158. The consumable 120 comprising the aerosol generating material 116, and in this example also comprising the susceptor arrangement 110, is inserted into the body 112 to configure the device 100 for use. The outer body 112 comprises a mouthpiece 114 to allow aerosol generated in use to exit the device 100.

In use, a user may activate, for example via a button (not shown) or a puff detector (not shown), the circuitry 140 to cause varying, e.g. alternating, current to be driven through the inductive element 158, thereby inductively heating the susceptor arrangement 110, which in turn heats the aerosol generating material 116, and causes the aerosol generating material 116 thereby to generate an aerosol. The aerosol is generated into air drawn into the device 100 from an air inlet (not shown), and is thereby carried to the mouthpiece 114, where the aerosol exits the device 100 for inhalation by a user. In other examples, the device 100 itself may not comprise a mouthpiece. For example, the consumable 120 may be configured to be engaged by the user to inhale the generated flow of aerosol.

The device 100 may be arranged to heat the aerosol generating material 116 to a range of temperatures to volatilize at least one component of the aerosol generating material 116 without combusting the aerosol generating material. For example, the temperature range may be about 50° C. to about 350° C., such as between about 50° C. and about 300° C., between about 100° C. and about 300° C., between about 150° C. and about 300° C., between about 100° C. and about 200° C., between about 200° C. and about 300° C., or between about 150° C. and about 250° C. In some examples, the temperature range is between about 170° C. and about 250° C. In some examples, the temperature range may be other than this range, and the upper limit of the temperature range may be greater than 300° C.

It will be appreciated that there may be a difference between the temperature of the susceptor arrangement 110 and the temperature of the aerosol generating material 116, for example during heating up of the susceptor arrangement 110, for example where the rate of heating is large. It will therefore be appreciated that in some examples the temperature at which the susceptor arrangement 110 is heated to may, for example, be higher than the temperature to which it is desired that the aerosol generating material 116 is heated.

In this example, the susceptor arrangement 110 is a part of the consumable 120 which is insertable into the device 100 to configure the device 100 for use. However, in other examples, the susceptor arrangement 110 may form a part of the device 100. For example, the susceptor arrangement 110 may form a tube defining a heating chamber in which aerosol generating material 116 may be received to be heated.

Figure 2:
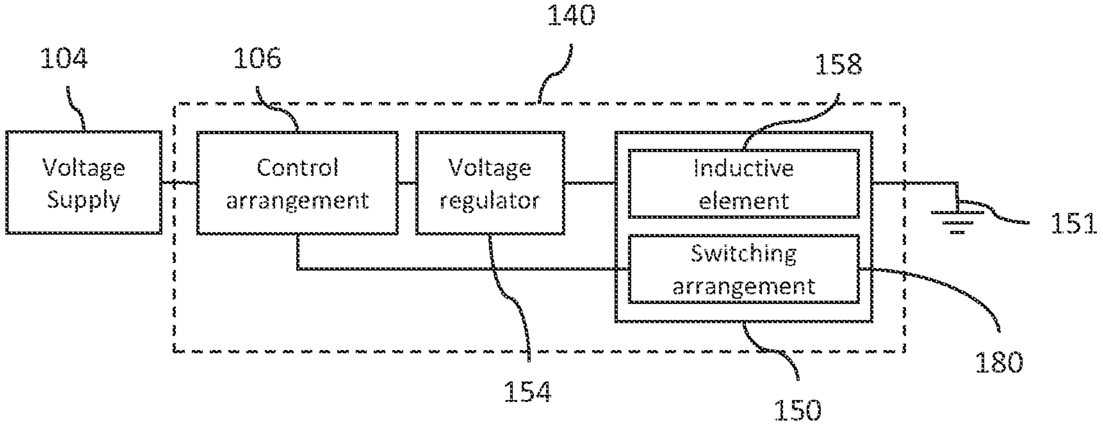
FIG. 2 illustrates schematically aspects of the circuitry of the aerosol-generating device.

FIG. 2 shows a schematic representation of the circuitry 140 of the device 100 and the voltage supply 104, according to an example.

The circuitry 140 comprises the control arrangement 106 and a resonant circuit 150. The resonant circuit 150 comprises the inductive element 158 and a switching arrangement 180 which is configured to cause a varying, e.g. alternating, current to flow through the inductive element 158 in order to inductively heat the susceptor arrangement 110. The susceptor arrangement 110 is not shown in FIG. 2, for the sake of clarity.

In this example, the circuitry 140 also comprises a voltage regulator 154. The voltage regulator 154 allows a voltage supplied to the resonant circuit 150 to be controlled. Controlling the voltage supplied to the circuit 150 controls the current flowing in the resonant circuit 150, and hence may control the energy transferred to the susceptor arrangement 110 by the resonant circuit 150.

The circuitry 140 is operable to operate in an operational mode in which the heating circuit 150 is operable to heat the susceptor arrangement 110 to cause an aerosol for inhalation to be generated. The circuitry 140 is also operable to operate in a temperature-sensing mode. In the temperature sensing mode the heating circuit 150 is caused to inductively impart energy to the susceptor arrangement 110 without substantially heating the susceptor arrangement 110. In the temperature-sensing mode, the control arrangement 106 is operable to determine a temperature of the susceptor arrangement 110 based on one or more electrical properties of the heating circuit 150. This will be discussed in more detail below.

The circuitry 140 accordingly may at any one time be operating in a heating mode to generate aerosol for inhalation by a user, or a temperature-sensing mode, wherein the temperature of the susceptor arrangement 110 is being determined without significant energy being imparted to the susceptor arrangement 110. Accordingly, the temperature-sensing mode allows the temperature of the susceptor arrangement 110 to be determined without heating the susceptor arrangement 110.

Operating the circuitry 140 in the operational heating mode comprises supplying a first DC voltage to the heating circuit 150 while operating the circuitry 140 in the temperature sensing mode comprises supplying a second DC voltage, which is different to the first DC voltage and which in this example is lower than the first DC voltage, to the heating circuit 150. In the temperature-sensing mode, the second DC voltage is continuously supplied to the heating circuit 150. A low-voltage temperature-sensing mode is thereby provided, the temperature of the susceptor arrangement 110 can be monitored without undesirably heating the susceptor arrangement 110.

In some examples, the voltage regulator 154 may be used to control the voltage supplied to the heating circuit 150. For example, the voltage regulator 154 may be configured to supply the first DC voltage in the operational mode and the second DC voltage in the temperature-sensing mode. In some examples, the voltage regulator 154 may also be configured to supply a variable voltage to the heating circuit 150 in the operational heating mode. This may allow the heating power of the heating circuit 150 to be adjusted.

The control arrangement 106 may control the operation of the voltage regulator 154 to allow the voltage supplied by the voltage regulator 154 to the heating circuit 150 to be controlled. For example, the control arrangement 106 may control a duty cycle of an input voltage provided to the voltage regulator 154.

In some examples, the voltage regulator 154 is a buck regulator, which is configured to step down the voltage received from the voltage supply 104 by a given amount. This may allow the voltage supplied to the heating circuit 150 to be switched between the first voltage used in the operational mode and the second voltage used in the temperature-sensing mode. The voltage regulator 154 may also, in the operational mode, allow the heating power to be controlled, e.g. reduced, by controlling the voltage supplied to the heating circuit 150.

In some examples, the voltage regulator 154 may be used to ensure that a constant voltage is supplied to the heating circuit 150 in the operational mode and/or in the temperature-sensing mode. This may allow for better control of the power provided by the circuit 150 to either heat the susceptor arrangement 110 (in the operational mode) or to excite the susceptor arrangement 110 such that its temperature can be determined (in the temperature sensing mode).

In some examples, in the operational mode, the voltage supplied to the heating circuit 150 may not be regulated by the voltage regulator 154. For example, the voltage supplied to the heating circuit 150 may be allowed to vary based on the loading provided by the heating circuit 150, which may vary based on the temperature of the susceptor arrangement 110, among other factors. For example, in the operational mode a raw battery voltage may be provided to the heating circuit 150. This may allow for lower energy losses in the operational mode, for example, by allowing the voltage regulator 154 to be bypassed.

The voltage regulator 154 may be used to switch the circuitry 140 between the operational mode and the temperature-sensing mode. The voltage regulator 154 may be used to provide a known, e.g. constant, voltage to be supplied to the heating circuit 150 in the temperature-sensing mode. This may allow for calculations performed by the control arrangement 106 in determining the temperature of the susceptor arrangement 110 to be simplified. For example, as will be described below, the control arrangement 106 may determine the temperature of the susceptor arrangement 110 based on one or more electrical properties of the heating circuit 150, such as one or more of the frequency at which the heating circuit is operating, the current drawn by the heating circuit, and the impedance across the heating circuit 150. The DC voltage supplied to the heating circuit 150 may also be used in such determinations. In some examples, a look-up table relating the temperature of the susceptor arrangement 110 to one or more pre-determined values of such electrical properties may be accessible by the control arrangement 106 to determine the temperature of the susceptor arrangement 110. Providing for a known, e.g. constant, voltage in the temperature-sensing mode may allow for a look-up table with fewer entries to be kept, and thus may reduce storage requirements and/or simplify the temperature determination process.

In some examples, a voltage may be supplied to drive the switching arrangement 180 which provides for the heating circuit 150 to generate a varying current through the inductive element 158. In the example shown in FIG. 2, the switching arrangement 180 receives a drive voltage from the control arrangement 106. The control arrangement 106 may, for example, provide for a voltage signal to be supplied to the switching arrangement 180 to power and/or control various components of the switching arrangement 180. Examples of the switching arrangement 180 will be described in more detail below.

The control arrangement 106 may in some examples comprise a micro-controller unit (MCU) configured to take an input from the voltage supply 104 and to receive various other inputs from sensors and the like. The MCU may also be configured to supply various outputs to components of the device 100, such as one or more outputs to provide power to the heating circuit 150 and to provide a drive voltage to the switching arrangement 180. The control arrangement 106 may be configured to monitor certain electrical properties of the heating circuit 150 in the temperature sensing mode such as the impedance of the circuit 150, the frequency at which the circuit 150 is operating, the voltage across the circuit 150 and/or the current drawn by the circuit 150. These properties may be used by the control arrangement 106 to determine a temperature of the susceptor arrangement 110.

Figure 3:
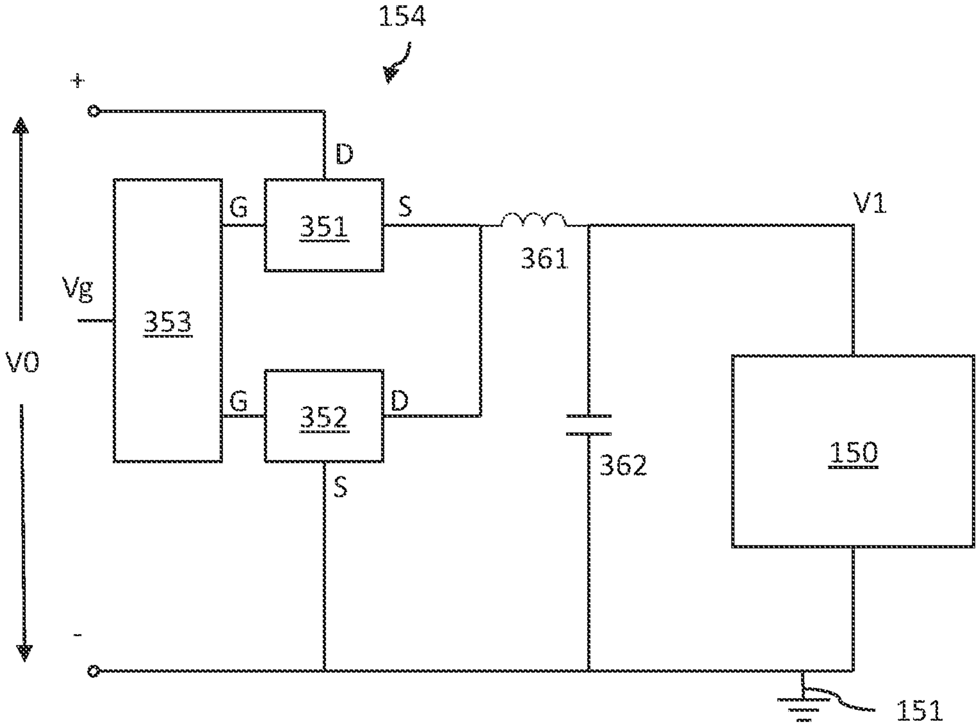
FIG. 3 illustrates aspects of the circuitry shown in FIG. 2 in further detail, according to one example.

FIG. 3 shows the voltage regulator 154 and the heating circuit 150 according to an example. The voltage regulator 154 in FIG. 3 is a buck regulator, which is configured to receive an input voltage of V0 from the control arrangement 106 and to output a voltage V1 across the heating circuit 150. The voltage regulator 154 is configured to allow the input voltage V0 to be stepped down to the output voltage V1, such that the output voltage V1 has a lower magnitude than the input voltage V0. In this example, therefore, the voltage regulator 154 may be referred to as a buck regulator.

By operating the voltage regulator 154 to change the DC output voltage V1, the circuitry 140 may be switched between the operational mode and the temperature-sensing mode. For example, the output voltage V1 may have a first magnitude in the operational mode, of for example from 3V to 5V, or for example around 4V. The output voltage V1 may have a second magnitude in the temperature-sensing mode, which is lower than the first magnitude. For example, in the temperature-sensing mode the voltage V1 may be from 1V to 3V, or around 2V. The heating power supplied by the heating circuit 150 to inductively heat the susceptor arrangement 110 is dependent on the voltage at which the heating circuit 150 is operating. Therefore, reducing the output voltage V1 of the voltage regulator allows for switching between the operational mode and the temperature-sensing mode.

The voltage regulator 154 shown in FIG. 3 comprises a first transistor 351, a second transistor 352, a gate driver 353, an output inductor 361 and an output capacitor 362. The first transistor 351 and second transistor 352 are both n-channel FETs. Each of the first transistor 351 and the second transistor 352 has a gate terminal G, a drain terminal D and a source terminal S. The gate terminals G of the first and second transistors 351, 352 are both connected to a gate driver 353. The gate driver 353 is configured to receive a gate drive signal Vg, in this example from the control arrangement 106, and to supply a gate voltage to operate the transistors 351, 352. The control arrangement 106 supplies a voltage V0 across a positive terminal and a negative terminal, which are labelled respectively + and − in FIG. 3. The positive terminal + connects to the drain terminal D of the first transistor 351. The source terminal S of the first transistor 351 is connected to the drain terminal D of the second transistor 352 and both of these terminals are connected to a first side of the output inductor 361. The source terminal S of the second transistor 352 is connected to ground 151. The output capacitor 362 of the voltage regulator 154 is connected between a second side of the output inductor 361 and ground 151. The heating circuit 150 is connected in parallel with the output capacitor 362, i.e. between the second side of the output inductor 361 and ground 151.

In one example, the voltage V0 across the positive terminal + and the negative terminal − is a fixed frequency voltage signal supplied from the control arrangement 106. A duty cycle of the fixed frequency voltage signal V0 may be variable by the control arrangement 106. Decreasing the duty cycle may allow the output voltage V1 of the voltage regulator 154 to be reduced. The voltage regulator 154 thus may be arranged to supply a desired DC voltage V1 to the heating circuit 150.

Figure 4A:
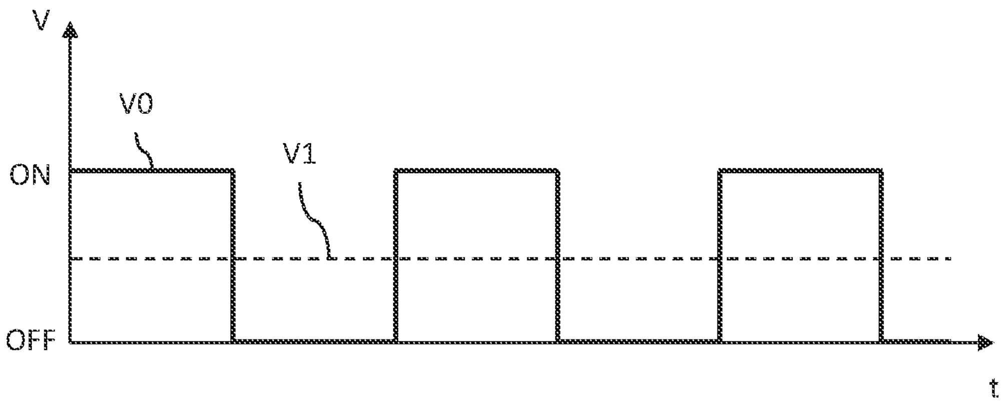
FIGS. 4A and 4B show schematic plots of voltages input to and output from a voltage regulator employed in certain examples.
Figure 4B:
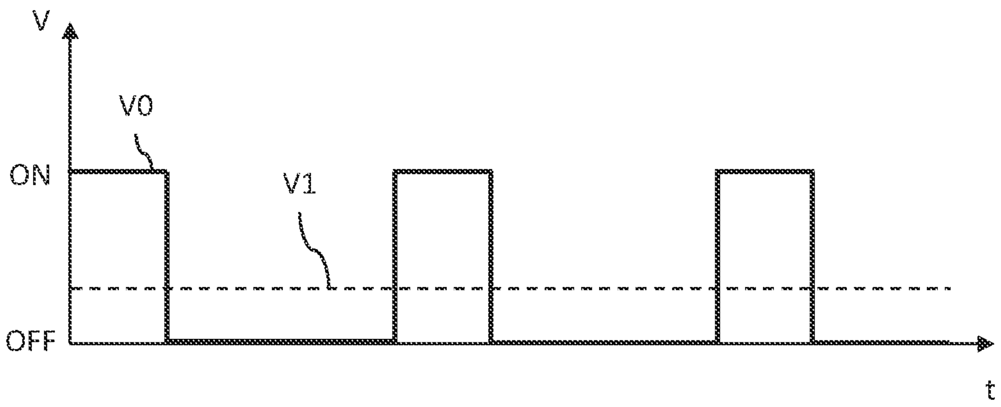

FIG. 4A and FIG. 4B show, schematically, an idealized representation of the resulting output voltage V1 output by the voltage regulator 154 for an input voltage V0 having different duty cycles. FIGS. 4A and 4B show schematic plots of voltage V on the vertical axis against time t on the horizontal axis. In FIG. 4A, a first example of the input voltage signal V0 is shown having a first duty cycle of around 50%. That is, the voltage signal V0 is in an "on" state for around half of the cycle and in an "off" state for rest of the cycle. The voltage V1 output by the voltage regulator 154 according to this first example is a steady DC voltage having a magnitude less than the magnitude of the voltage signal V0 in the "on" state. In the first example, shown in FIG. 4A, the voltage V1 output by the voltage regulator 154 may have a magnitude of around half that of the input signal V0 in the "on" state. In FIG. 4B, a second example is shown in which the input voltage signal V0 has the same magnitude in the "on" state as in the first example but a different duty cycle. FIG. 4B shows the input voltage signal V0 having a duty cycle of around 30%. In FIG. 4B, the output voltage V1 is again a steady DC output voltage with a magnitude less than that of the input voltage V0 in the "on" state. However, because of the lower duty cycle of the input signal V0 in FIG. 4B, the magnitude of V1 in FIG. 4B is corresponding reduced compared to the magnitude of V1 in FIG. 4A. For example, in FIG. 4B, V1 may have a magnitude of substantially 30% that of the input voltage V0 in the "on" state.

Operating according to the principles schematically illustrated in FIGS. 4A and 4B, changing of the duty cycle may allow for the output voltage V1 to be reduced to switch the circuitry 140 from the operational, high voltage, mode for heating the susceptor arrangement 110, and the temperature sensing, low voltage, mode, for determining a temperature of the susceptor arrangement 110 without causing substantial heating.

In a variation of the circuit shown in FIG. 3 (which is not shown in the figures), the output inductor 361, the output capacitor 362 are omitted. It has been found that in certain examples, the inductance provided by the output inductor 361 and the capacitance provided by the output capacitor 362 can be provided by the heating circuit 150 where the heating circuit 150 is as described herein. This allows the number of parts in the circuitry 140 to be reduced.

Figure 5:
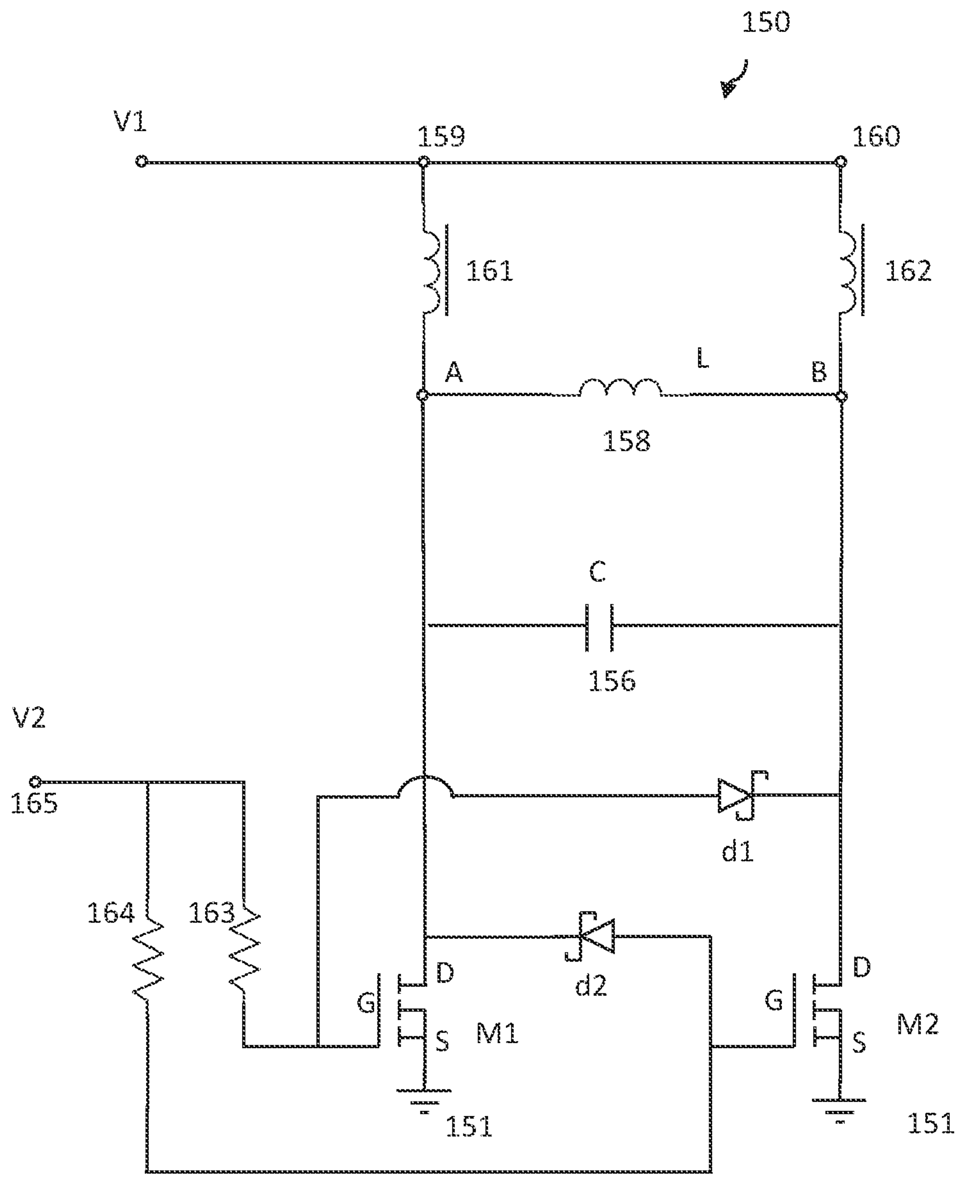
FIG. 5 illustrates schematically a first example heating circuit.

Turning now to FIG. 5 further details of the heating circuit 150 are shown, according to a first example. In this example, the heating circuit 150 is a resonant LC circuit, arranged for inductive heating of the susceptor arrangement 110. The heating circuit 150 accordingly may be referred to as the resonant circuit in the examples, which follow.

The resonant circuit 150 comprises a switching arrangement 180 which, in this example, comprises a first transistor M1 and a second transistor M2. The first transistor M1 and the second transistor M2 each comprise a first terminal G, a second terminal D and a third terminal S. The inductive element 158 and the capacitor 156 are connected in parallel. The second terminals D of the first transistor M1 and the second transistor M2 are connected to either side of parallel combination of the inductive element 158 and the capacitor 156, as will be explained in more detail below. The third terminals S of the first transistor M1 and the second transistor M2 are each connected to ground 151. The first transistor M1 and the second transistor M2 are both MOSFETS having first, gate, terminals G; second, drain, terminals D; and third, source, terminals S. The transistors M1, M2 are both n-channel MOSFETs in this example.

It will be appreciated that in alternative examples other types of transistors may be used in place of the MOSFETs described above.

The resonant circuit 150 has an inductance L and a capacitance C. The inductance L of the resonant circuit 150 is provided by the inductive element 158 and may also be affected by an inductance of the susceptor arrangement 110 which is arranged for inductive heating by the inductive element 158. The inductive heating of the susceptor arrangement 110 is via a varying magnetic field generated by the inductive element 158, which, in the manner described above, induces Joule heating and/or magnetic hysteresis losses in the susceptor arrangement 110. A portion of the inductance L of the resonant circuit 150 may be due to the magnetic permeability of the susceptor arrangement 110. The varying magnetic field generated by the inductive element 158 is generated by a varying, for example alternating, current flowing through the inductive element 158.

The inductive element 158 may, for example, be in the form of a coiled conductive element. For example, inductive element 158 may be a copper coil. The inductive element 158 may comprise, for example, multi-stranded wire, such as Litz wire, for example, a wire comprising a number of individually insulated wires twisted together. The AC resistance of a multi-stranded wire is a function of frequency and the multi-stranded wire can be configured in such a way that the power absorption of the inductive element is reduced at a driving frequency. As another example, the inductive element 158 may be a coiled track on a printed circuit board, for example. Using a coiled track on a printed circuit board may be useful as it provides for a rigid and self-supporting track, with a cross section which obviates any requirement for multi-stranded wire (which may be expensive), which can be mass produced with a high reproducibility for low cost. Although one inductive element 158 is shown, it will be readily appreciated that there may be more than one inductive element 158 arranged for inductive heating of one or more susceptor arrangements 110.

The capacitance C of the resonant circuit 150 is provided by the capacitor 156. The capacitor 156 may be, for example, a Class 1 ceramic capacitor, for example, a COG type capacitor. The total capacitance C may also comprise the stray capacitance of the resonant circuit 150; however, this is or can be made negligible compared with the capacitance provided by the capacitor 156.

The resistance of the resonant circuit 150 is not shown in FIG. 5 but it should be appreciated that a resistance of the circuit may be provided by the resistance of the track or wire connecting the components of the resonant circuit 150, the resistance of the inductor 158, and/or the resistance to current flowing through the resonant circuit 150 provided by the susceptor arrangement 110 arranged for energy transfer with the inductor 158. In some examples, one or more dedicated resistors (not shown) may be included in the resonant circuit 150

The resonant circuit 150 is supplied with a DC supply voltage V1 provided from the DC power source 104 via the voltage regulator 154 as has been described above. The voltage regulator 154 outputs a DC voltage V1 across the resonant circuit 150. A first point 159 and at a second point 160 in the resonant circuit 150 are at voltage V1 while the source terminals of both the MOSFETs M1 and M2 connect to ground 151.

The resonant circuit 150 may therefore be considered to be connected as an electrical bridge with the inductive element 158 and the capacitor 156 in parallel connected between the two arms of the bridge. The resonant circuit 150 acts to produce a switching effect, described below, which results in a varying, e.g. alternating, current being drawn through the inductive element 158, thus creating the alternating magnetic field and heating the susceptor arrangement 110.

The first point 159 is connected to a first node A located at a first side of the parallel combination of the inductive element 158 and the capacitor 156. The second point 160 is connected to a second node B, to a second side of the parallel combination of the inductive element 158 and the capacitor 156. A first choke inductor 161 is connected in series between the first point 159 and the first node A, and a second choke inductor 162 is connected in series between the second point 160 and the second node B. The first and second chokes 161 and 162 act to filter out AC frequencies from entering the circuit from the first point 159 and the second point 160 respectively but allow DC current to be drawn into and through the inductor 158. The chokes 161 and 162 allow the voltage at A and B to oscillate with little or no visible effects at the first point 159 or the second point 160.

In this particular example, the first MOSFET M1 and the second MOSFET M2 are n-channel enhancement mode MOSFETs. The drain terminal of the first MOSFET M1 is connected to the first node A via a conducting wire or the like, while the drain terminal of the second MOSFET M2 is connected to the second node B, via a conducting wire or the like. The source terminal of each MOSFET M1, M2 is connected to ground 151.

The resonant circuit 150 comprises a second voltage source V2, gate voltage supply (or sometimes referred to herein as a control voltage), with its positive terminal connected at a third point 165 which is used for supplying a voltage to the gate terminals G of the first and second MOSFETs M1 and M2. The control voltage V2 supplied at the third point 165 in this example is independent of the voltage V1 supplied at the first and second points 159, 160, which enables variation of voltage V1 without impacting the control voltage V2. A first pull-up resistor 163 is connected between the third point 165 and the gate terminal G of the first MOSFET M1. A second pull-up resistor 164 is connected between the third point 165 and the gate terminal G of the second MOSFET M2. The control voltage V2 in this example is output from the control arrangement 106, which receives power from the voltage supply 104.

In other examples, a different type of transistor may be used, such as a different type of FET. It will be appreciated that the switching effect described below can be equally achieved for a different type of transistor which is capable of switching from an "on" state to an "off" state. The values and polarities of the supply voltages V1 and V2 may be chosen in conjunction with the properties of the transistor used, and the other components in the circuit. For example, the supply voltages may be chosen in dependence on whether an n-channel or p-channel transistor is used, or in dependence on the configuration in which the transistor is connected, or the difference in the potential difference applied across terminals of the transistor which results in the transistor being either on or off.

The resonant circuit 150 further comprises a first diode d1 and a second diode d2, which in this example are Schottky diodes, but in other examples, any other suitable type of diode may be used. The gate terminal G of the first MOSFET M1 is connected to the drain terminal D of the second MOSFET M2 via the first diode d1, with the forward direction of the first diode d1 being towards the drain D of the second MOSFET M2.

The gate terminal G of the second MOSFET M2 is connected to the drain D of the first second MOSFET M1 via the second diode d2, with the forward direction of the second diode d2 being towards the drain D of the first MOSFET M1. The first and second Schottky diodes d1 and d2 may have a diode threshold voltage of around 0.3V. In other examples, silicon diodes may be used having a diode threshold voltage of around 0.7V. In examples, the type of diode used is selected in conjunction with the gate threshold voltage, to allow desired switching of the MOSFETs M1 and M2. It will be appreciated that the type of diode and gate supply voltage V2 may also be chosen in conjunction with the values of pull-up resistors 163 and 164, as well as the other components of the resonant circuit 150.

The resonant circuit 150 supports a current through the inductive element 158 which is a varying current due to switching of the first and second MOSFETs M1 and M2. Since, in this example the MOSFETs M1 and M2 are enhancement mode MOSFETS, when a voltage applied at the gate terminal G of one of the MOSFETs is such that a gate-source voltage is higher than a predetermined threshold for that MOSFET, the MOSFET is turned to the ON state. Current may then flow from the drain terminal D to the source terminal S which is connected to ground 151. The series resistance of the MOSFET in this ON state is negligible for the purposes of the operation of the circuit, and the drain terminal D can be considered to be at ground potential when the MOSFET is in the ON state. The gate-source threshold for the MOSFET may be any suitable value for the resonant circuit 150 and it will be appreciated that the magnitude of the voltage V2 and resistances of the resistors 163, 164 are chosen dependent on the gate-source threshold voltage of the MOSFETs M1, M2, essentially so that voltage V2 is greater than the gate threshold voltage(s).

The switching procedure of the resonant circuit 150 which results in varying current flowing through the inductive element 158 will now be described starting from a condition where the voltage at first node A is high and the voltage at the second node B is low.

When the voltage at node A is high, the voltage at the drain terminal D of the first MOSFET M1 is also high because the drain terminal of M1 is connected, directly in this example, to the node A via a conducting wire. At the same time, the voltage at the node B is held low and the voltage at the drain terminal D of the second MOSFET M2 is correspondingly low (the drain terminal of M2 being, in this example, directly connected to the node B via a conducting wire).

Accordingly, at this time, the value of the drain voltage of M1 is high and is greater than the gate voltage of M2. The second diode d2 is therefore reverse-biased at this time. The gate voltage of M2 at this time is greater than the source terminal voltage of M2, and the voltage V2 is such that the gate-source voltage at M2 is greater than the ON threshold for the MOSFET M2. M2 is therefore ON at this time.

At the same time, the drain voltage of M2 is low, and the first diode d1 is forward biased due to the gate voltage supply V2 to the gate terminal of M1. The gate terminal of M1 is therefore connected via the forward biased first diode d1 to the low voltage drain terminal of the second MOSFET M2, and the gate voltage of M1 is therefore also low. In other words, because M2 is on, it is acting as a ground clamp, which results in the first diode d1 being forward biased, and the gate voltage of M1 being low. As such, the gate-source voltage of M1 is below the ON threshold and the first MOSFET M1 is OFF.

In summary, at this point the circuit 150 is in a first state, wherein:

voltage at node A is high;

voltage at node B is low;
first diode d1 is forward biased;
second MOSFET M2 is ON;
second diode d2 is reverse biased; and
first MOSFET M1 is OFF.

From this point, with the second MOSFET M2 being in the ON state, and the first MOSFET M1 being in the OFF state, current is drawn from the supply V1 through the first choke 161 and through the inductive element 158. Due to the presence of inducting choke 161, the voltage at node A is free to oscillate. Since the inductive element 158 is in parallel with the capacitor 156, the observed voltage at node A follows that of a half sinusoidal voltage profile. The frequency of the observed voltage at node A is equal to the resonant frequency $f_0$ of the circuit 150.

The voltage at node A reduces sinusoidally in time from its maximum value towards 0 as a result of the energy decay at node A. The voltage at node B is held low (because MOSFET M2 is on) and the inductor L is charged from the DC supply V1. The MOSFET M2 is switched off at a point in time when the voltage at node A is equal to or below the gate threshold voltage of M2 plus the forward bias voltage of d2. When the voltage at node A has finally reached zero, the MOSFET M2 will be fully off.

At the same time, or shortly after, the voltage at node B is taken high. This happens due to the resonant transfer of energy between the inductive element 158 and the capacitor 156. When the voltage at node B becomes high due to this resonant transfer of energy, the situation described above with respect to the nodes A and B and the MOSFETs M1 and M2 is reversed. That is, as the voltage at A reduces towards zero, the drain voltage of M1 is reduced. The drain voltage of M1 reduces to a point where the second diode d2 is no longer reverse biased and becomes forward biased. Similarly, the voltage at node B rises to its maximum and the first diode d1 switches from being forward biased to being reverse biased. As this happens, the gate voltage of M1 is no longer coupled to the drain voltage of M2 and the gate voltage of M1 therefore becomes high, under the application of gate supply voltage V2. The first MOSFET M1 is therefore switched to the ON state, since its gate-source voltage is now above the threshold for switch-on. As the gate terminal of M2 is now connected via the forward biased second diode d2 to the low voltage drain terminal of M1, the gate voltage of M2 is low. M2 is therefore switched to the OFF state.

In summary, at this point the circuit 150 is in a second state, wherein:

voltage at node A is low;
voltage at node B is high;
first diode d1 is reverse biased;
second MOSFET M2 is OFF;
second diode d2 is forward biased; and
first MOSFET M1 is ON.

At this point, current is drawn through the inductive element 158 from the supply voltage V1 through the second choke 162. The direction of the current has therefore reversed due to the switching operation of the resonant circuit 150. The resonant circuit 150 will continue to switch between the above-described first state in which the first MOSFET M1 is OFF and the second MOSFET M2 is ON, and the above-described second state in which the first MOSFET M1 is ON and the second MOSFET M2 is OFF.

In the steady state of operation, energy is transferred between the electrostatic domain (i.e., in the capacitor 156) and the magnetic domain (i.e., the inductor 158), and vice versa.

The net switching effect is in response to the voltage oscillations in the resonant circuit 150 where we have an energy transfer between the electrostatic domain (i.e., in the capacitor 156) and the magnetic domain (i.e., the inductor 158), thus creating a time-varying current in the parallel LC circuitry, which varies at the resonant frequency of the resonant circuit 150. This is advantageous for energy transfer between the inductive element 158 and the susceptor arrangement 110 since the resonant circuit 150 operates at its optimal efficiency level. In the operational mode, this may allow for more efficient heating of the aerosol generating material 116 compared to circuitry operating off resonance. The described switching arrangement is advantageous as it allows the resonant circuit 150 to drive itself at the resonant frequency under varying load conditions. What this means is that in the event that the properties of the resonant circuit 150 change (for example if the susceptor 110 is present or not, or if the temperature of the susceptor changes, or even physical movement of the susceptor element 110), the dynamic nature of the resonant circuit 150 continuously adapts its resonant point to transfer energy in an optimal fashion, thus meaning that the resonant circuit 150 is always driven at resonance. Moreover, the configuration of the resonant circuit 150 is such that no external controller or the like is required to apply the control voltage signals to the gates of the MOSFETS to effect the switching.

In examples described above, the gate terminals G are supplied with a gate voltage via a second power supply which is different to the power supply for the source voltage V1. However, in some examples, the gate terminals may be supplied with the same voltage supply as the source voltage V1. In such examples, the first point 159, second point 160 and third point 165 in the circuit 150 may, for example, be connected to the same power rail output from the voltage regulator 154. In such examples, it will be appreciated that the properties of the components of the circuit must be chosen to allow the described switching action to take place. For example, the gate supply voltage and diode threshold voltages should be chosen such that the oscillations of the circuit trigger switching of the MOSFETs at the appropriate level. The provision of separate voltage values for the gate supply voltage V2 and the source voltage V1 allows for the source voltage V1 to be varied independently of the gate supply voltage V2 without affecting the operation of the switching mechanism of the circuit.

The resonant frequency $f_0$ of the circuit 150 may be in the MHz range, for example in the range 0.5 MHz to 4 MHz, for example in the range 2 MHz to 3 MHz. It will be appreciated that the resonant frequency $f_0$ of the resonant circuit 150 is dependent on the inductance L and capacitance C of the circuit 150, as set out above, which in turn is dependent on the inductive element 158, capacitor 156 and additionally the susceptor arrangement 110. As such, the resonant frequency $f_0$ of the circuit 150 can vary from implementation to implementation. For example, the frequency may be in the range 0.1 MHz to 4 MHz, or in the range of 0.5 MHz to 2 MHz, or in the range 0.3 MHz to 1.2 MHz. In other examples, the resonant frequency may be in a range different from those described above. Generally, the resonant frequency will depend on the characteristics of the circuitry, such as the electrical and/or physical properties of the components used, including the susceptor arrangement 110.

It will also be appreciated that the properties of the resonant circuit 150 may be selected based on other factors for a given susceptor arrangement 110. For example, in order to improve the transfer of energy from the inductive element 158 to the susceptor arrangement 110, it may be useful to select the skin depth (i.e. the depth from the surface of the susceptor arrangement 110 within which the current density falls by a factor of 1/e, which is at least a function of frequency) based on the material properties of the susceptor arrangement 110. The skin depth differs for different materials of susceptor arrangements 110 and reduces with increasing drive frequency. On the other hand, for example, in order to reduce the proportion of power supplied to the resonant circuit 150 and/or driving element that is lost as heat within the electronics, it may be beneficial to have a circuit, which drives itself at relatively lower frequencies. Since the drive frequency is equal to the resonant frequency in this example, the considerations here with respect to drive frequency are made with respect to obtaining the appropriate resonant frequency, for example by designing a susceptor arrangement 110 and/or using a capacitor 156 with a certain capacitance and an inductive element 158 with a certain inductance. In some examples, a compromise between these factors may therefore be chosen as appropriate and/or desired.

The resonant circuit 150 of FIG. 5 has a resonant frequency $f_0$ at which the current I is minimized and the dynamic impedance is maximized. The resonant circuit 150 drives itself at this resonant frequency and therefore the oscillating magnetic field generated by the inductor 158 is maximum, and the inductive energy transfer to the susceptor arrangement 110 by the inductive element 158 is maximized.

The voltage regulator 154 allows inductive heating of the susceptor arrangement 110 by the resonant circuit 150 to be controlled by controlling the supply voltage V1 provided to the resonant circuit 150. Controlling the supply voltage V1 in turn controls the current flowing in the resonant circuit 150, and hence may control the energy transferred to the susceptor arrangement 110 by the resonant circuit 150, and hence the degree to which the susceptor arrangement 110 is heated. In some examples, as the temperature of the susceptor arrangement 110 is monitored a determination made of whether the susceptor arrangement 110 is to be heated to a greater or lesser degree. A desired heating power to be used in the operational heating mode may be determined accordingly. The desired heating power may then be supplied by employing the voltage regulator 154 to change the magnitude of the DC voltage V1 supplied to the resonant circuit 150 in the operational heating mode.

As mentioned above, the inductance L of the resonant circuit 150 is provided by the inductive element 158 arranged for inductive heating of the susceptor arrangement 110. At least a portion of the inductance L of resonant circuit 150 is due to the magnetic permeability of the susceptor arrangement 110. The inductance L, and hence resonant frequency $f_0$ of the resonant circuit 150 may therefore depend on the specific susceptor(s) used and its positioning relative to the inductive element(s) 158, which may change from time to time. Further, the magnetic permeability of the susceptor arrangement 110 may vary with varying temperature of the susceptor 110.

Figure 6:
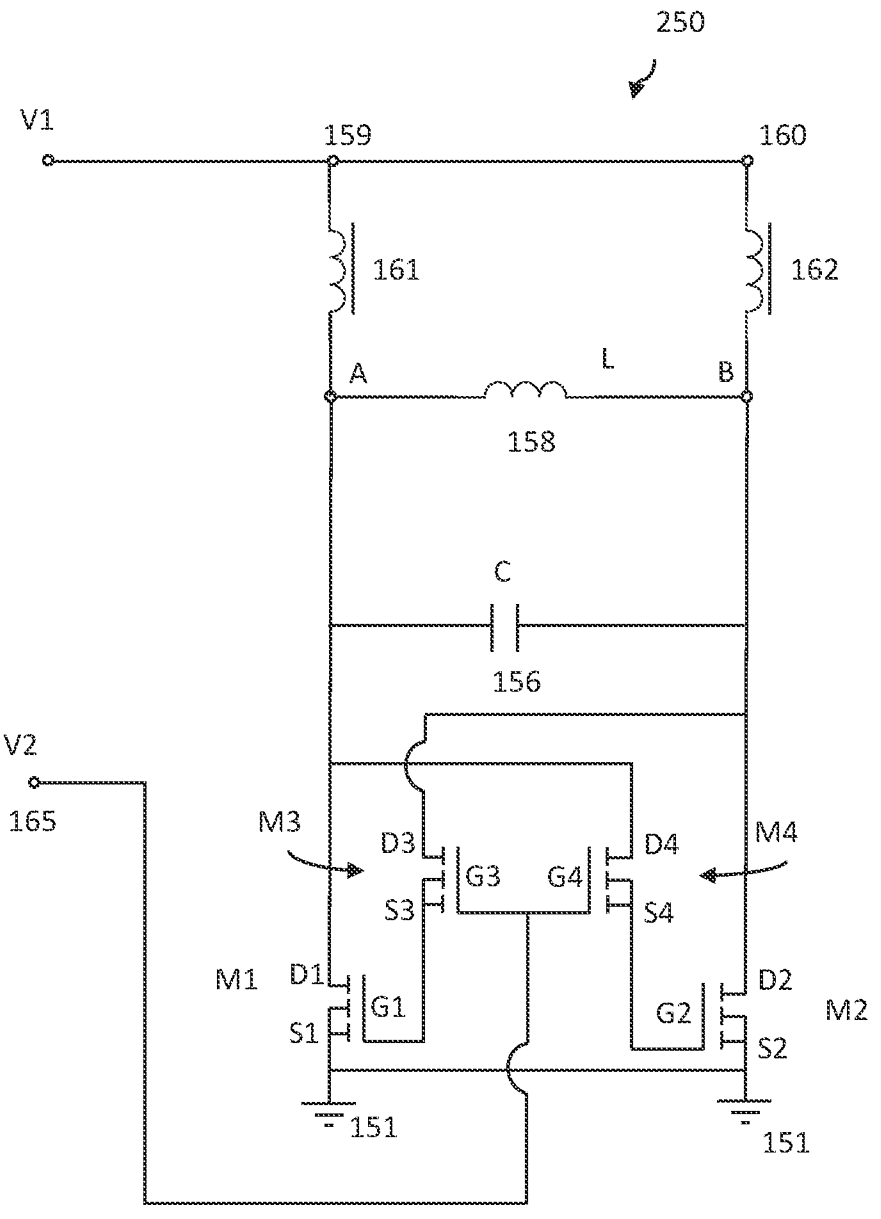
FIG. 6 illustrates schematically a second example heating circuit.

FIG. 6 shows a second example of a resonant circuit 250. The second resonant circuit 250 comprises many of the same components as the resonant circuit 150 and like components in each of the resonant circuits 150, 250 are provided with the same reference numerals and will not be described in detail again.

The second circuit 250 differs from the first circuit 150 in that the second circuit 250 does not comprise the diodes d1, d2, via which the gate terminals G1, G2 of each of the transistors M1, M2 are respectively connected to the drain terminals D1, D2 of the other of the transistors M1, M2. Instead of the diodes d1, d2 which are included in the first circuit 150, the second circuit 250 comprises a third MOSFET M3 and a fourth MOSFET M4.

In the second circuit 250, the gate G1 of the first MOSFET M1 is connected to the drain D2 of the second MOSFET M2 via the third MOSFET M3. The gate G2 of the second MOSFET M2 is similarly connected to the drain D1 of the first MOSFET M1 via a fourth MOSFET M4. The control voltage V2 is supplied from the point 165 to gate terminals G3, G4 of both the third MOSFET M3 and the fourth MOSFET M4. In an example, such as the example represented by FIG. 6, the gate terminals G3, G4 of the third MOSFET M3 and the fourth MOSFET M4 are connected to one another via an electrical conductor, for example an electrical track, and the voltage V2 supplied to a point on the electrical conductor. It will be appreciated that each of the third MOSFET M3 and the fourth MOSFET M4 has a gate threshold voltage such that when a voltage greater than the threshold voltage is applied to its gate terminal G3, G4, the respective MOSFET M3, M4 is turned "on" such that current may flow from its drain terminal to its source terminal. In examples, the voltage V2 is greater than the threshold voltages of the third and fourth MOSFETs M3, M4 such that applying the control voltage V2 turns the third and fourth MOSFETs M3, M4 to the ON state. In an example, the threshold voltage of the third MOSFET M3 is equal to the threshold voltage of the fourth MOSFET M4. In some examples, the second circuit 250 may comprise one of more pull-down resistors (not shown in FIG. 6) connected between the gates G1, G2 of the first and second MOSFETs M1, M2 and ground.

The second circuit 250 operates as a self-oscillating circuit which causes a varying current to flow through the inductive element 158 in the manner described with reference to the first example circuit 150 with reference to FIG. 5. Differences in the behavior of the second circuit 250 from that of the first example circuit 150 due to the use of MOSFETs M3, M4 rather than diodes d1, d2, will become apparent from the following description.

The switching procedure of the second circuit 250 which results in a varying current flowing through the inductive element 158 will now be described.

When the voltage V2 is applied to the gates G3, G4 of the third and fourth MOSFETs M3, M4, the third and fourth MOSFETs are turned "on". Providing that a voltage V1, at this point, each of the first, second, third and fourth MOSFETs M1-M4 is in the ON state. At this point, the voltages at nodes A and B start to fall. Certain imbalances may exist in the circuit 250, for example differences in resistance between the MOSFETs M1-M4, or the properties of the values of inductors present in the circuit. These imbalances act such that the voltage at one of the nodes A or B begins to fall faster than the voltage at the other of these nodes A, B. The MOSFET M1, M2 corresponding to the node A, B at which the voltage falls fastest will remain in the ON state. The other of the MOSFETS M1, M2, corresponding with the other of nodes A, B is switched to the OFF state. The following describes the situation wherein the voltage at node A begins oscillating and the voltage at the node B remains at zero. However, equally, it may be the case that it is the voltage at the node B which begins oscillating while the voltage at node A remains at zero volts.

When the voltage at node A rises, the voltage at the drain terminal D1 of the first MOSFET M1 also rises because the drain terminal D1 of first MOSFET M1 is connected to the node A via a conducting wire. At the same time, the voltage at the node B is held low and the voltage at the drain terminal D2 of the second MOSFET M2 is correspondingly low (the drain terminal D2 of the second MOSFET M2 being, in this example, directly connected to the node B via a conducting wire).

As the voltage at the node A and the drain D1 of the first MOSFET M1 rises, the voltage at the gate G2 of the second MOSFET M2 rises. This is due to the drain D1 being connected via the fourth MOSFET M4 to the gate G2 of the second MOSFET M2 and the fourth MOSFET M4 being "on" due to the voltage V2 being applied to its gate terminal G4.

As the voltage at the drain D1 of the first MOSFET M1 rises, the voltage at the gate G2 of the second MOSFET M2 continues to rise until it reaches a maximum voltage value $V_{max}$. The maximum voltage value $V_{max}$ reached at the gate G2 of the second MOSFET M2 is dependent on the control voltage V2 and the gate-source voltage of the fourth MOSFET M4 ($V_{gsM4}$). The maximum value $V_{max}$ may be expressed as $V_{max}=V2-V_{gsM4}$.

After a half cycle of oscillation at the resonant frequency of the circuit 250, the voltage at the drain D1 of the first MOSFET M1 begins decreasing. The voltage at the drain D1 of the first MOSFET M1 decreases until it reaches 0V. At this point, the first MOSFET M1 turns from "off" to "on" and the second MOSFET M2 turns from "on" to "off".

The circuit then continues to oscillate in a similar manner as described above, except with the node A remaining at zero volts while the node B is free to oscillate. That is, the voltage at the drain D2 of the second MOSFET M2 and at the node B then begins rising, while the voltage at the drain D1 of the first MOSFET M1 and the node A remains at zero.

As the voltage at the node B and the drain D2 of the second MOSFET M2 rises, the voltage at the gate G1 of the first MOSFET M1 rises since the drain D2 is connected via the third MOSFET M3 to the gate G1 of the first MOSFET M1 and the third MOSFET M3 is "on" due to the voltage V2 being applied to its gate terminal G3.

As the voltage at the drain D2 of the second MOSFET M2 rises, the voltage at the gate G1 of the first MOSFET M1 continues to rise until it reaches a maximum voltage value $V_{max}$. The maximum voltage value $V_{max}$ reached at the gate G1 is dependent on the control voltage V2 and the gate-source voltage of the third MOSFET M3 ($V_{gsM3}$). The maximum value $V_{max}$ may be expressed as $V_{max}=V2-V_{gsM3}$. In this example, the gate-source voltages of the third and fourth MOSFETs M3, M4 are equal to one another, i.e. $V_{gsM3}=V_{gsM4}$.

After a half cycle of oscillation at the resonant frequency of the second circuit 250, the voltage at the drain D2 of the second MOSFET M2 begins decreasing. The voltage at the drain D2 of the second MOSFET M2 decreases until it reaches 0V. At this point, the second MOSFET M2 turns from "off" to "on" and the first MOSFET M1 turns from "on" to "off".

In the manner described with reference to the first example circuit 150, when the second MOSFET M2 is in the ON state, and the first MOSFET M1 is in the OFF state, current is drawn from the supply V1 through the first choke 161 and through the inductive element 158. When the first MOSFET M1 is in the ON state, and the second MOSFET M2 is in the OFF state, current is drawn from the supply V1 through the second choke 162 and through the inductive element 158. The second example circuit 250 therefore oscillates in the same manner as described for the first example circuit 150, with the direction of the current reversing with each switching operation of the circuit 250.

The use of third and fourth MOSFETs M3, M4, in some examples, may be advantageous because it may allow for lower energy losses. That is, the first example circuit 150 may result in resistive losses due to some current draw through the pull-up resistors 163, 164 to ground 151. For example, when the first MOSFET M1 is in the ON state, the second diode d2 is forward biased and thus a small current may be drawn through the second pull-up resistor 164, resulting in resistive losses. Similarly, when the second MOSFET M2 is in the ON state, there may be resistive losses due to current drawn through the first pull-up resistor 163. The second example circuit in examples may omit the resistors 163, 164. The second example circuit 250 may reduce such losses by substituting the pull-up resistors 163, 164 and the diodes d1, d2 for third and fourth MOSFETs M3, M4. For example, in the second example circuit 250, when the first MOSFET M1 is in the OFF state the current drawn through the third MOSFET M3 may be essentially zero. Similarly, in the second example circuit 250, when the second MOSFET M2 is in the OFF state the current drawn through the fourth MOSFET M4 may be essentially zero. Thus, resistive losses may be reduced by use of the arrangement shown in the second circuit 250. Further, energy may be required to charge and discharge the gates G1, G2 of first MOSFET M1 and second MOSFET M2. The second circuit 250 may provide for this energy to be effectively provided from the nodes A and B.

Example circuits above have been described comprising two choke inductors 161, 162. In another example, an example inductive heating circuit may comprise only one choke inductor. In such an example circuit, the inductor coil 158 may be "center-tapped".

Figure 7:
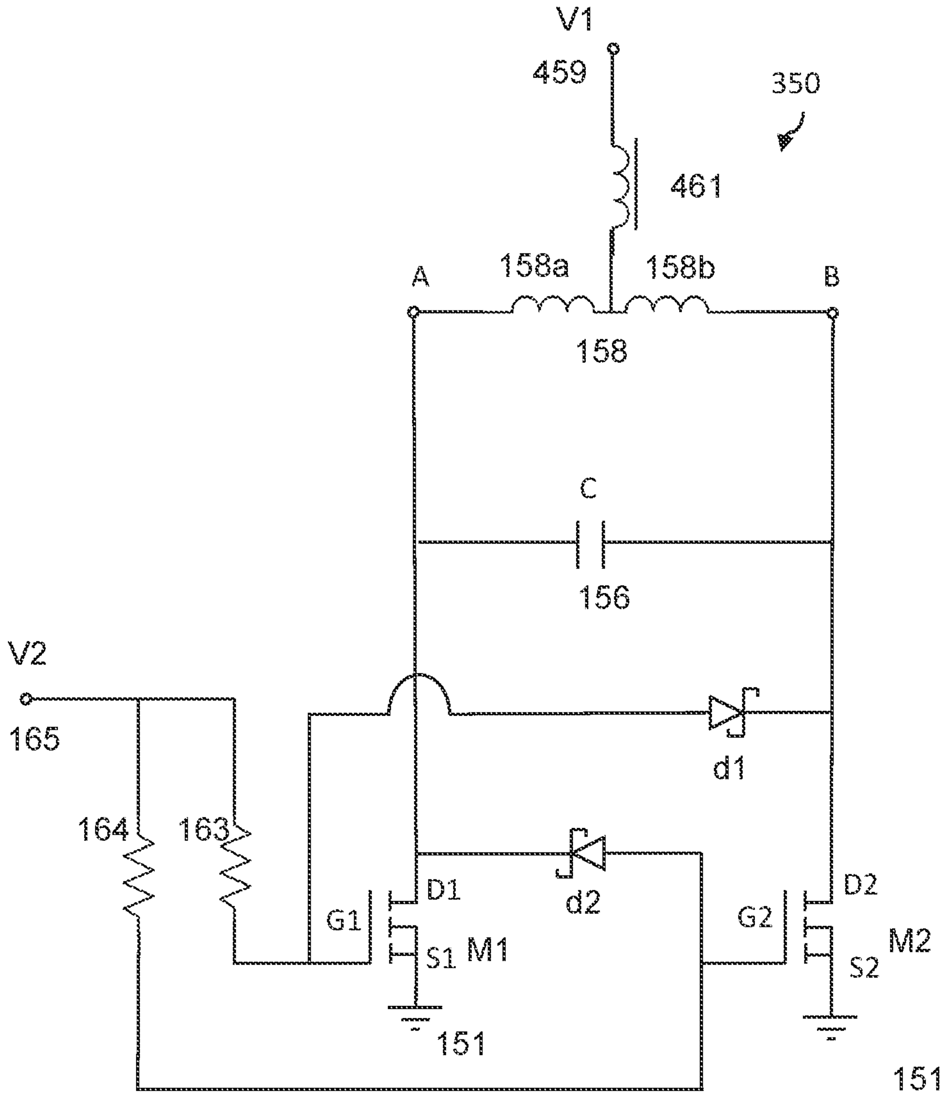
FIG. 7 illustrates schematically a third example heating circuit.

FIG. 7 shows a third example circuit 350 which is a variation on the first example circuit 150 and in which the coil 158 is a center-tapped coil and a single choke inductor 461 replaces the first and second choke inductors 161, 162. Again, components that are the same as those in the circuit 150 illustrated in FIG. 5 are given the same reference numerals in FIG. 7.

In the third circuit 350, voltage V1 is applied via the choke inductor 461 to a center of the inductor coil 158, at a single point 459 as opposed to at first and second points 159, 160 in the first example circuit 150. Rather than, as in the first and second example circuits 150, 250, current being drawn alternately through the first choke 161 and the second choke 162 as the current in the circuit changes direction due to the resonant oscillations of the circuit, current is drawn through the single choke inductor 461 and alternately drawn through a first part **158*a* of the inductor 158 and through a second part 158*b* of the inductor 158 as the current oscillations in the circuit 350 change direction due to the switching operation of the MOSFETs M1, M2. The third circuit 350 operates in an equivalent manner to the first circuit 150** in other respects.

Figure 8:
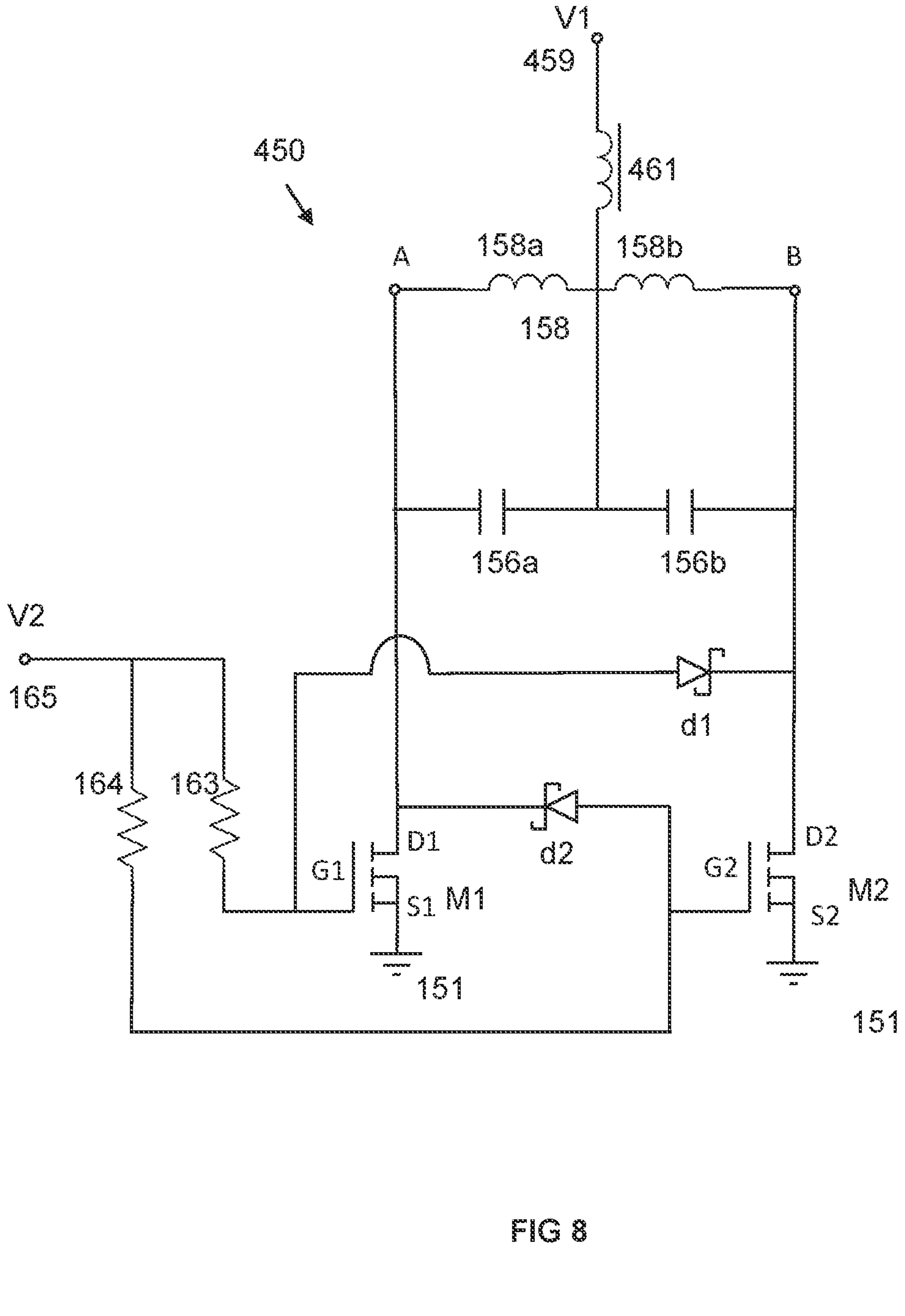
FIG. 8 illustrates schematically a fourth example heating circuit.

A fourth example circuit is shown in FIG. 8. Again, components that are the same as those in the circuit 150 illustrated in FIG. 5 are given the same reference numerals in FIG. 8. The fourth circuit 450 differs from the third circuit 350 in that, rather than comprising the single capacitor 156 of the third circuit 350, the fourth circuit 450 is provided with a first capacitor **156*a* and a second capacitor 156*b*. The fourth circuit 450, similarly to the third circuit 350 comprises a center-tapped arrangement with the inductor comprising a first part 158*a* and a second part 158*b*. The voltage V1 is applied via the choke inductor 461 to a center of the inductor coil 158 (as in the arrangement of FIG. 6) and, further, the center of the inductor coil 158 is electrically connected to a point between the first capacitor 156***a* and the second capacitor 156*b*. Two adjacent circuit loops are therefore provided, one comprising the first inductor part 158*a* and the first capacitor 156*a* and the other comprising the second inductor part 158*b* and the second capacitor 156*b*. The fourth circuit 450 operates in an equivalent manner to the third circuit 350 in other respects.

The center-tapped arrangement described with reference to FIG. 7 and FIG. 8 can equally be applied in an arrangement which uses third and fourth MOSFETs instead of diodes, in the manner described with reference to FIG. 6. The use of a center-tapped arrangement may be advantageous since the number of parts required to assemble the circuit may be reduced. For example, the number of choke inductors may be reduced from two to one.

In examples described herein the susceptor arrangement 110 is contained within a consumable and is therefore replaceable. For example, the susceptor arrangement 110 may be disposable and for example integrated with the aerosol generating material 116 that it is arranged to heat. The resonant circuit 150 allows for the circuit to be driven at the resonance frequency, automatically accounting for differences in construction and/or material type between different susceptor arrangements 110, and/or differences in the placement of the susceptor arrangements 110 relative to the inductive element 158, as and when the susceptor arrangement 110 is replaced. Furthermore, the resonant circuit 150 is configured to drive itself at resonance regardless of the specific inductive element 158, or indeed any component of the resonant circuit 150 used. This is particularly useful to accommodate for variations in manufacturing both in terms of the susceptor arrangement 110 but also with regards to the other components of the circuit 150. For example, the resonant circuit 150 allows the circuit to remain driving itself at the resonant frequency regardless of the use of different inductive elements 158 with different values of inductance, and/or differences in the placement of the inductive element 158 relative to the susceptor arrangement 110. The circuit 150 is also able to drive itself at resonance even if the components are replaced over the lifetime of the device.

In some examples, the aerosol-generating device 100 is configured to be usable with a plurality of different types of consumables each of which consumables comprises a different type of susceptor arrangement to the other consumables.

The different susceptor arrangements may be formed, for example, of different materials or be of different shapes or different sizes or different combinations of different materials or shapes or sizes.

In use, the resonant frequency of the circuit 150 is dependent upon the particular susceptor arrangement of whichever type of consumable is coupled to, for example inserted into, the device 100. However, the alternating frequency through the inductive element 158 of the resonant circuit, due to the self-oscillating arrangement of the circuit 150, is configured to self-adjust to match changes in the resonant frequency caused by the coupling of a different susceptor/consumable to the inductive element. Accordingly, the circuit is configured to inductively transfer energy to a given susceptor arrangement at the resonant frequency of the circuit 150 when that consumable is coupled to the device 100, regardless of the properties of the susceptor arrangement or consumable.

In some examples, the aerosol-generating device 100 is configured to receive a first consumable having a first susceptor arrangement and the device is also configured to receive a second consumable having a second susceptor arrangement that is different to the first susceptor arrangement.

For example, the device 100 may be configured to receive a first consumable comprising an aluminum susceptor of a particular size and also be configured to receive a second consumable comprising a steel susceptor, which may be of a different shape and/or size to the aluminum susceptor.

The varying current in the circuit 150 is maintained at a first resonant frequency of the resonant circuit 150 when the first consumable is coupled to the device and is maintained at a second resonant frequency of the resonant circuit when the second consumable is coupled to the device 100.

The aerosol-generating device 100 in examples comprises a receiving portion for receiving a consumable. The receiving portion may be configured to receive a plurality of types of consumables, such as the first consumable or the second consumable. FIG. 1 shows the aerosol-generating device 100 in receipt of a consumable 120, which is schematically shown to be received in a receiving portion 130 of the aerosol generating device 100. The receiving portion 130 may be a cavity or chamber in the body 112 of the device. When the consumable 120 is in the receiving portion 130, the susceptor arrangement 110 of the consumable 120 is arranged in proximity for inductive coupling and heating by the inductive element 158.

The device 100 may be configured to receive a plurality of different consumables of different shapes.

In examples, as mentioned above, the inductive element 158 is an electrically conductive coil. In such examples, at least a part of the susceptor arrangement of a consumable may be configured to be received within the coil. This may provide efficient inductive coupling between the susceptor arrangement and the inductive element and as such provide for efficient heating of the susceptor arrangement.

Certain features of the operation of the aerosol generating device 100 comprising resonant circuit 150, will now be described, according to an example. Before the device 100 is turned on, the device 100 may be in an 'off' state, i.e. no current flows in the resonant circuit 150. The device 100 is switched to an 'on' state, for example by a user turning the device 100 on. Upon switching on of the device 100 the circuitry 140 begins drawing current from the voltage supply 104, such that a voltage is supplied to the heating circuit 150 via the voltage regulator 154 and the current through the inductive element 158 varies at the resonant frequency $f_0$. The device 100 may remain in the on state until a further input is received by the control arrangement 106, for example until the user no longer pushes the button (not shown), or the puff detector (not shown) is no longer activated, or until a maximum heating duration has elapsed. The resonant circuit 150 being driven at the resonant frequency $f_0$ causes an alternating current I to flow in the resonant circuit 150 and the inductive element 158, and hence for the susceptor arrangement 110 to be inductively heated in the operational heating mode.

As the susceptor arrangement 110 is inductively heated, its temperature (and hence the temperature of the aerosol generating material 116) increases. In this example, the susceptor arrangement 110 (and aerosol generating material 116) is heated such that it reaches a steady temperature $T_{MAX}$. The temperature $T_{MAX}$ may be a temperature, which is substantially at or above a temperature at which a substantial amount of aerosol is generated by the aerosol generating material 116. The temperature $T_{MAX}$ may be between around 200 and around 300° C. for example (although of course may be a different temperature depending on the material 116, susceptor arrangement 110, the arrangement of the overall device 100, and/or other requirements and/or conditions). The device 100 is therefore in a 'heating' state or mode, wherein the aerosol generating material 116 reaches a temperature at which aerosol is substantially being produced, or a substantial amount of aerosol is being produced. It should be appreciated that in most, if not all cases, as the temperature of the susceptor arrangement 110 changes, so too does the resonant frequency $f_0$ of the resonant circuit 150. This is because magnetic permeability of the susceptor arrangement 110 is a function of temperature and, as described above, the magnetic permeability of the susceptor arrangement 110 influences the coupling between the inductive element 158 and the susceptor arrangement 110, and hence the resonant frequency $f_0$ of the resonant circuit 150.

As described above, the control arrangement 106 is configured to also cause the device 100 to operate in a temperature-sensing mode. In the temperature-sensing mode, the circuitry 140 operates in a similar manner as described above for the operational mode to inductively transfer energy to the susceptor arrangement 110. However, the resonant circuit 150 is supplied with a different, e.g. lower, voltage in the temperature-sensing mode than in the operational mode, such that the inductive transfer of energy to the susceptor arrangement 110 does not substantially heat the susceptor arrangement 110 but allows the temperature of the susceptor arrangement 110 to be determined. That is, the inductive transfer of energy (or the rate of supply of energy, i.e., power) to the susceptor arrangement 110 in the temperature sensing mode is not sufficient to cause the susceptor arrangement 110 to increase in temperature.

In various examples, the control arrangement 106 may be configured to switch between the operational mode and the temperature-sensing mode according to different control schemes. For example, the control arrangement 106 may cause the circuitry 140 to operate in the operational mode using a fixed voltage for a pre-determined time period. The controller 106 may then, at pre-determined intervals, cause the circuitry 140 to operate in the temperature sensing mode to determine the temperature of the susceptor arrangement 110. This can be thought of as a pre-determined schedule of alternating periods of the temperature-sensing mode and the operation mode. An action may be taken dependent on the determined temperature of the susceptor arrangement 110. For example, if the susceptor arrangement 110 is at or above a target temperature, the control arrangement 106 may not cause the circuitry 140 to operate in the operational heating mode for the next scheduled period, e.g. to allow the susceptor arrangement 110 to cool towards the target temperature.

In one example, the control arrangement 106 may be configured to control operation of the circuitry 140 dependent on the result of the comparison between the determined temperature and the target temperature. For example, where the control arrangement 106 is capable of adjusting the power supplied by the heating circuit 150, e.g. by using the voltage regulator 154 to adjust the voltage supplied to the heating circuit 150, the control arrangement 106 may supply a voltage having a magnitude based on a difference between the determined temperature and the target temperature, which may be referred to as delta T. If delta T is large, for example, the control arrangement 106 may cause a correspondingly large voltage to be supplied to the heating circuit 150 in the operational mode, thereby to supply high heating power to more quickly increase the temperature of the susceptor arrangement 110. Conversely, where delta T is small, the control arrangement 106 may reduce the voltage supplied to the heating circuit 150. In one example, where no heating is required, the control arrangement 106 may cause a voltage equal in magnitude to the voltage applied in the temperature-sensing mode to be applied.

The target temperature may in some examples change throughout a usage session, for example, according to a predefined heating profile.

In another example, the control arrangement 106, may be configured to adjust a proportion of the time in which the circuitry 140 is operated in the operational heating mode versus a proportion of the time the circuitry 140 is operated in the temperature-sensing mode. For example, if the temperature of the susceptor arrangement 110 is above the target temperature, by reducing the proportion of time in which the circuitry 140 operates in the operational mode, the average heating power supplied to heat the susceptor arrangement 110 may be reduced. Similarly, to the manner in which the magnitude of the voltage supplied during the operational mode may be controlled, the control arrangement 106 may be configured to control the proportion of time in which the circuitry 140 operates in the operational mode based on a determined delta T.

Since temperature-sensing modes described herein may operate at low voltages, energy may be inductively imparted to the susceptor arrangement 110 for the purpose of making temperature measurements for longer than would be the case than if operating at higher voltages. One advantage of this is that measurements of the electrical properties of the circuit 150 being monitored can be taken over longer periods, allowing for more accurate measurements. For example, measurements of the frequency at which the heating circuit 150 is operating in the temperature-sensing mode may be taken over a longer period allowing a more accurate average value to be determined. Thus, the temperature of the susceptor arrangement 110 may be monitored accurately without heating the susceptor arrangement 110.

In certain examples, the temperature of the susceptor arrangement 110 may also be monitored while the circuit is operating in the operational mode to heat the susceptor arrangement 110, although in some implementations the temperature of the susceptor arrangement 110 may increase during the operational mode and thus the measure of the temperature may, for example, be less accurate than when made in the temperature sensing mode. The same principles as are used to determine the temperature of the susceptor arrangement 110 in the temperature sensing mode may be applied at the higher voltages typically used in the operational mode to determine the temperature. In such examples, the controller may determine an action to take, such as entering the operational mode for a subsequent period, or applying a particular the voltage during the operational heating mode, dependent on the temperature determined during the sense mode and/or during the operational heating mode. In one example, the temperature measurements determined from operation in the operational mode may be used to monitor the temperature of the susceptor arrangement 110 while actions to be taken by the controller in relation to how to heat the susceptor arrangement 110 may be taken based on the measurements taken during the temperature-sensing mode.

The present disclosure predominantly describes an arrangement in which an LC parallel circuit arrangement is powered to heat the susceptor arrangement 110. As mentioned above, for an LC parallel circuit at resonance, the impedance is maximum and the current is minimum. Note that the current being minimum generally refers to the current observed outside of the parallel LC loop, e.g., to the left of choke 161 or to the right of choke 162. Conversely, in a series LC circuit, current is at maximum and, generally speaking, a resistor may be inserted to limit the current to a safe value to prevent damage to certain electrical components within the circuit. This may reduce the efficiency of the circuit because energy is lost through the resistor. A parallel circuit operating at resonance may not have such restrictions.

In some examples, the susceptor arrangement 110 comprises or consists of aluminum. Aluminum is an example of a non-ferrous material and as such has a relative magnetic permeability close to one. What this means is that aluminum has a generally low degree of magnetization in response to an applied magnetic field. Hence, it has generally been considered difficult to inductively heat aluminum, particularly at low voltages such as those used in aerosol provision systems. It has also generally been found that driving circuitry at resonance frequency is advantageous as this provides optimum coupling between the inductive element 158 and susceptor arrangement 110. For aluminum, it is observed that a slight deviation from the resonant frequency causes a noticeable reduction in the inductive coupling between the susceptor arrangement 110 and the inductive element 158, and thus a noticeable reduction in the heating efficiency (in some cases to the extent where heating is no longer observed). As mentioned above, as the temperature of the susceptor arrangement 110 changes, so too does the resonant frequency of the circuit 150. Therefore, in the case where the susceptor arrangement 110 comprises or consists of a non-ferrous susceptor, such as aluminum, the resonant circuit 150 of the present disclosure is advantageous in that the circuitry is always driven at the resonant frequency (independent of any external control mechanism). This means that maximum inductive coupling and thus maximum heating efficiency is achieved at all times enabling aluminum to be efficiently heated. It has been found that a consumable including an aluminum susceptor can be heated efficiently when the consumable includes an aluminum wrap forming a closed electrical circuit and/or having a thickness of less than 50 microns.

In examples where the susceptor arrangement 110 forms part of a consumable, the consumable may take the form of that described in PCT/EP2016/070178, the entirety of which is incorporated herein by reference.

As mentioned above, the device 100 is provided with a temperature determiner for, in use, determining a temperature of the susceptor arrangement 110. As has also been discussed above, the temperature determiner may be the control arrangement 106, for example, a processor that controls the overall operation of the device 100. The temperature determiner 106 determines a temperature of the susceptor arrangement 110 based on one or more properties of the heating circuit 150, for example, one or more of a frequency that the heating circuit 150 is being driven at, a DC current being drawn by the heating circuit 150 and a DC voltage being supplied to the heating circuit 150.

In examples described herein, the temperature determiner 106 operates in the temperature-sensing mode to determine the temperature of the susceptor arrangement 110. In one example, the temperature of the susceptor arrangement 110 may be determined based on a determined correlation between the temperature of the susceptor arrangement 110 and the electrical properties of the heating circuit 150 when operating in the temperature-sensing mode.

In one example, the electrical properties on which the temperature determination is made comprise the DC voltage supplied to the circuit 150, e.g. the output voltage V1 from the voltage regulator 154, and a DC current drawn by the heating circuit 150. The current drawn by the heating circuit 150 may be measured, e.g., by use of a current sense resistor, and provided to the control arrangement 106 for the temperature of the susceptor arrangement 110 to be determined therefrom.

In another example, the temperature of the susceptor arrangement 110 may be determined based on a determined correlation between the temperature of the susceptor 110, the DC voltage supplied to the circuit 150, e.g. the output voltage V1 from the voltage regulator 154, and a frequency at which the circuit 150 is operating. The frequency at which the circuit 150 is operating may be determined, for example, by measuring a frequency at which the switching arrangement 180 changes states. For example, a frequency at which either or both of the MOSFETS M1, M2 change between an on state and an off state may be monitored and used to indicate the frequency of oscillations in the circuit 150.

In yet another example, the temperature of the susceptor arrangement 110 may be determined based on a determined correlation between the temperature of the susceptor 110, the DC voltage supplied to the circuit 150, e.g. the output voltage V1 from the voltage regulator 154, and an impedance of the circuit 150.

In one example, the temperature determiner 106 determines a temperature of the susceptor arrangement 110 based on a frequency that the resonant heating circuit 150 is being driven at, a DC current being drawn by the heating circuit 150, and a DC voltage being supplied to the heating circuit 150. Methods of determining the temperature of the susceptor arrangement 110 according to this example will now be described in more detail.

A correlation between any of the above-mentioned electrical properties of the heating circuit 150 and the temperature of the susceptor arrangement 110 may be determined by performing a calibration process. For example, the values of such properties may be measured while the temperature of the susceptor arrangement 110 is measured by a temperature sensor while being heated by the heating circuit 150.

Without wishing to be bound by theory, the following description explains the derivation of relationships between electrical and physical properties of the resonant circuit 150 which allow the temperature of the susceptor arrangement 110 in some examples described herein to be determined.

In use, the impedance at resonance of the parallel combination of the inductive element 158 and the capacitor 156 is the dynamic impedance $R_{dyn}$.

As explained above, the action of the switching arrangement M1 and M2 results in a DC current drawn from the DC voltage source, e.g from the voltage regulator 154, being converted into an alternating current that flows through the inductive element 158 and capacitor 156. An induced alternating voltage is also generated across the inductive element 158 and the capacitor 156.

As a result of the oscillatory nature of the resonant circuit 150, the impedance looking into the oscillatory circuit is $R_{dyn}$ for a given source voltage $V_s$, which is the voltage V1 output across the circuit 150 by the voltage regulator 154 in certain example circuits described above. A current $I_s$ will be drawn in response to $R_{dyn}$. Therefore, the impedance of the load $R_{dyn}$ of the resonant circuit 150 may be equated with the impedance of the effective voltage and current draw. This allows the impedance of the load to be determined via determination, for example measuring values, of the DC voltage $V_s$ and the DC current $I_s$, as per equation (1) below.

$$R_{dyn} = \frac{V_s}{I_s} \quad (1)$$

At the resonant frequency $f_0$, the dynamic impedance $R_{dyn}$ is $$R_{dyn} = \frac{L}{Cr} \quad (2)$$

where the parameter r can be considered to represent the effective grouped resistance of the inductive element 158 and the influence of the susceptor arrangement 110 (when present), and, as described above, L is the inductance of the inductive element 158, and C is the capacitance of the capacitor 156. The parameter r is described herein as an effective grouped resistance. As will be appreciated from the description below, the parameter r has units of resistance (Ohms), but in certain circumstances may not be considered to represent a physical/real resistance of the circuit 150.

As described above, the inductance of the inductive element 158 here takes into account the interaction of the inductive element 158 with the susceptor arrangement 110. As such, the inductance L depends on the properties of the susceptor arrangement 110 and position of the susceptor arrangement 110 relative to the inductive element 158. The inductance L of the inductive element 158 and hence of the resonant circuit 150 is dependent on, amongst other factors, the magnetic permeability μ of the susceptor arrangement 110. Magnetic permeability μ is a measure of the ability of a material to support the formation of a magnetic field within itself, and expresses the degree of magnetization that a material obtains in response to an applied magnetic field. The magnetic permeability μ of a material from which the susceptor arrangement 110 is comprised may change with temperature.

From equations (1) and (2) the following equation (3) can be obtained $$r = \frac{LI_s}{CV_s} \quad (3)$$

The relation of the resonant frequency $f_0$ to the inductance L and capacitance C can be modelled in at least two ways, given by equations (4a and 4b) below.

$$f_0 = \frac{1}{2\pi\sqrt{LC}} \quad (4a)$$

$$f_0 = \frac{1}{2\pi L}\sqrt{\frac{L}{C} - r^2} \quad (4b)$$

Equation (4a) represents the resonant frequency as modelled using a parallel LC circuit comprising an inductor L and a capacitor C, whereas Equation (4b) represents the resonant frequency as modelled using a parallel LC circuit with an additional resistor r in series with the inductor L. It should be appreciated for Equation (4b) that as r tends to zero; Equation (4b) tends to Equation (4a).

In the following, we assume that r is small and hence we can make use of Equation (4a). As will be described below, this approximation works well as it combines the changes within the circuit 150 (e.g., in inductance and temperature) within the representation of L. From equations (3) and (4a) the following expression can be obtained $$r = \frac{I_S}{V_S}\frac{1}{(2\pi f_0 C)^2} \quad (5)$$

It will be appreciated that Equation (5) provides an expression for the parameter r in terms of measurable or known quantities. It should be appreciated here that the parameter r is influenced by the inductive coupling in the resonant circuit 150. When loaded, i.e., when a susceptor arrangement is present, it may not be the case that we can consider the value of the parameter r to be small. In which case, the parameter r may no longer be an exact representation of the group resistances, but r is instead a parameter which is influenced by the effective inductive coupling in the circuit 150. The parameter r is said to be a dynamic parameter, which is dependent on the properties of the susceptor arrangement 110, as well as the temperature T of the susceptor arrangement. The value of DC source $V_s$ is known (e.g. the voltage V1 output by the voltage regulator 154) or may be measured by use of an appropriately place voltmeter, and the value of the DC current $I_s$ drawn by the heating circuit 150 may be measured by any suitable means, such as by measuring a voltage across a current sense resistor.

The frequency $f_0$ may be measured and/or determined to allow then the parameter r to be obtained.

In one example, the frequency $f_0$ may be measured via use of a frequency-to-voltage (F/V) converter 210. The F/V converter 210 may, for example, be coupled to a gate terminal of one of the first MOSFET M1 or the second MOSFET M2. In examples where other types of transistors are used in the switching mechanism of the circuit, the F/V converter 210 may be coupled to a gate terminal, or other terminal, which provides a periodic voltage signal with frequency equal to the switching frequency of one of the transistors. The F/V converter 210 therefore may receive a signal from the gate terminal of one of the MOSFET M1, M2 representative of the resonance frequency $f_0$ of the resonant circuit 150. The signal received by the F/V converter 210 may be approximately a square-wave representation with a period representative of the resonant frequency of the resonant circuit 210. The F/V converter 210 may then use this period to represent the resonant frequency $f_0$ as an output voltage.

Accordingly, as C is known from the value of the capacitance of the capacitor 156, and $V_s$, $I_s$, and $f_0$ can be measured, for example as described above, the parameter r can be determined from these measured and known values.

The parameter r of the inductive element 158 changes as a function of temperature, and further as a function of the inductance L. This means that the parameter r has a first value when the resonant circuit 150 is in an "unloaded" state, i.e. when the inductive element 158 is not inductively coupled to the susceptor arrangement 110, and the value of r changes when the circuit moves into a "loaded" state, i.e. when the inductive element 158 and susceptor arrangement 110 are inductively coupled with each other.

In using the method described herein in the temperature-sensing mode to determine the temperature of the susceptor arrangement 110, whether the circuit is in the "loaded" state, or the "unloaded" state may be taken into account. For example, the value of the parameter r of the inductive element 158 in a particular configuration may be known and may be compared to a measured value to determine whether the circuit is "loaded" or "unloaded". In some examples, whether the resonant circuit 150 is unloaded or loaded may be determined by control arrangement 106 detecting the insertion of a susceptor arrangement 110, for example detecting the insertion of a consumable containing a susceptor arrangement 110, into the device 100. The insertion of the susceptor arrangement 110 may be detected via any suitable means, such as an optical sensor or a capacitive sensor, for example. In other examples, the unloaded value of the parameter r may be known and stored in the control arrangement 106. In some examples, the susceptor arrangement 110 may comprise a part of the device 100 and so the resonant circuit 150 may continually be considered to be in the loaded state.

Once it is determined, or can be assumed, that the resonant circuit 150 is in the loaded state, with a susceptor arrangement 110 inductively coupled to the inductive element 158, a change in the parameter r can be assumed to be indicative of a change in temperature of the susceptor arrangement 110. For example, the change in r may be considered indicative of heating of the susceptor arrangement 110 by the inductive element 158.

The device 100 (or effectively the resonant circuit 150) may be calibrated to enable the temperature determiner 106 to determine the temperature of the susceptor arrangement 110 based on a measurement of the parameter r.

The calibration may be performed on the resonant circuit 150 itself (or on an identical test circuit used for calibration purposes) by measuring the temperature T of the susceptor arrangement 110 with a suitable temperature sensor such as a thermocouple, at multiple given values of the parameter r, and taking a plot of r against T.

Figure 9:
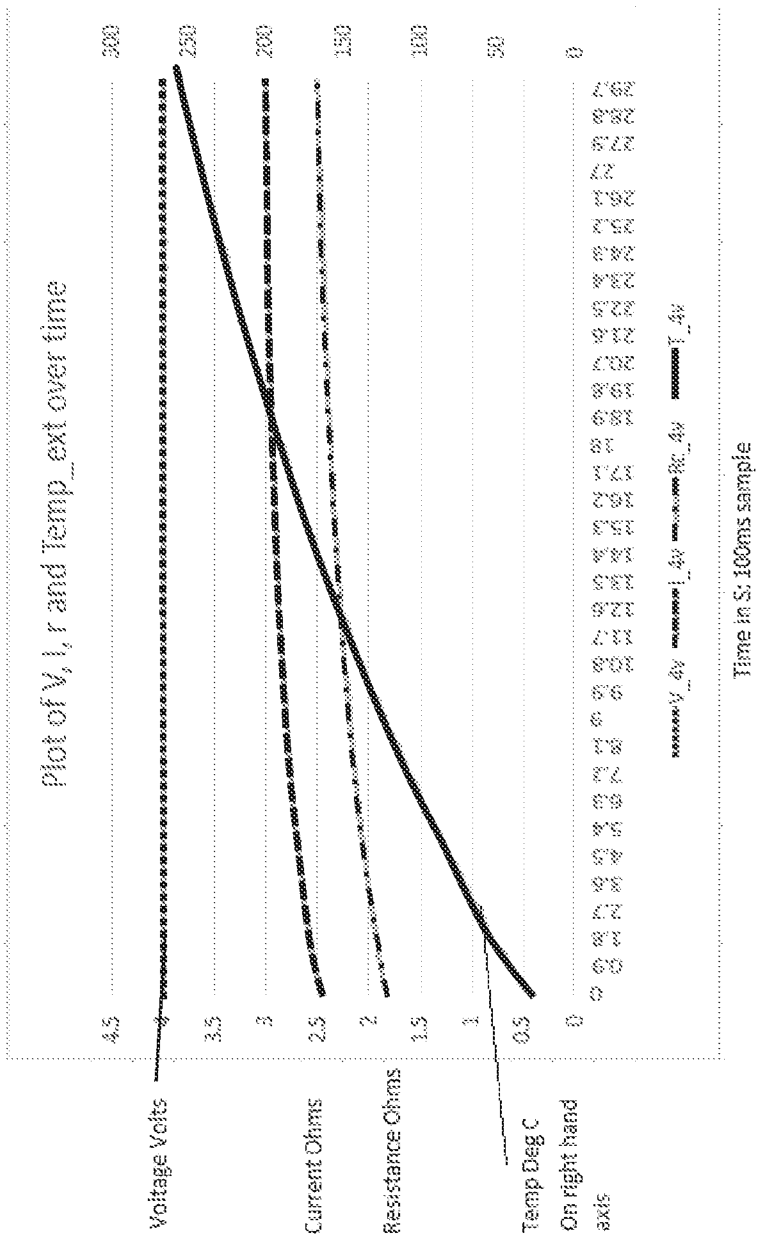
FIG. 9 shows plots of voltage, current, effective grouped resistance and susceptor arrangement temperature against time according to an example.

FIG. 9 shows an example of measured values of $V_s$, $I_s$, r and T shown on the y-axis against time t of operation of the resonant circuit 150 on the x-axis. It can be seen that at an essentially constant DC supply voltage $V_s$ of around 4V, over a time t of approximately 30 seconds, the DC current $I_s$ increases from around 2.5 A to around 3 A, and the parameter r increases from around 1.7-1.80 to around 2.562. At the same time, the temperature T increases from around 20-25° C. to around 250-260° C. Although FIG. 9 shows operation of the heating circuit 150 with a supply voltage of around 4V, which may be more typical for the operational heating mode than for the lower voltage temperature sensing mode, the principles of temperature determination described with reference to FIG. 9 are the same at the lower supply voltages used in the temperature sensing mode.

Figure 10:
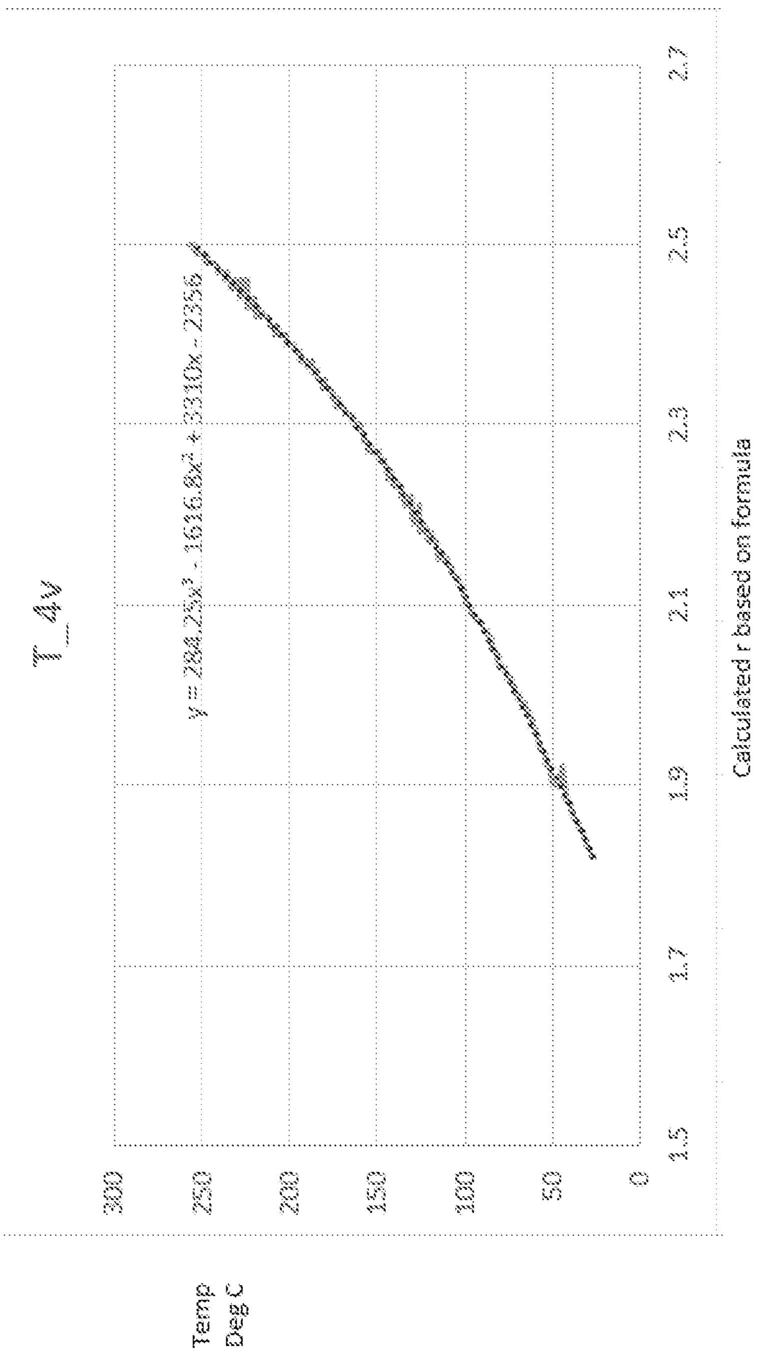
FIG. 10 shows a plot of susceptor arrangement temperature against parameter r according to an example.

FIG. 10 shows a calibration graph based on the values of r and T shown in FIG. 9 and described above. In FIG. 10, temperature T of the susceptor arrangement 110 is shown on the y-axis while the parameter r is shown on the x-axis. In the example of FIG. 10, a function has been fitted to the plot of T against r, which in this example is a third-order polynomial function. The function is fitted to the values of r that correspond to a change in temperature T. As mentioned above, the value of the parameter r may also change between an unloaded state (when no susceptor arrangement 110 is present) and a loaded state (when a susceptor arrangement 110 is present), although this is not shown in FIG. 10. Thus, the range of r chosen to be plotted for such a calibration may be selected so as to exclude any change in r due to changes in the circuit, e.g. changing to/from "loaded" and "unloaded" states. In other examples, other functions may be fit to the plot or an array of values for r and T may be stored in a look-up format, for example in a look-up table. Although as mentioned above that in a loaded state we may not consider that r is small, it has been found that the approximation of Equation 4a still enables an accurate track of the temperature. Without wishing to be bound by theory, it is thought that changes in the various electrical and magnetic parameters of the circuit are 'wrapped up' in the value of L of Equation 4a.

In use, the temperature determiner 106 may receive values of the DC voltage $V_s$, the DC current $I_s$ and the frequency $f_0$ and determine a value of the parameter r in accordance with Equation 5 above. The temperature determiner may determine a value for the temperature of the susceptor arrangement 110 using the calculated value of the parameter r, for example, by calculating the temperature using a function such as the one illustrated in FIG. 10, or performing a look up in a table of values for the parameter r and temperature T obtained by calibration as explained above.

In some examples, this may allow the control arrangement 106 to take an action based on a determined temperature of the susceptor 110. For example, as described above, the circuitry 140 may be caused to operate in the operational mode to heat the susceptor arrangement 110 if it is determined that the temperature of the susceptor arrangement 110 is below a target value. If, for example, the determined temperature is above a target value, the control arrangement 106 may cause the circuitry 140 to continue operating in the temperature sensing mode (and not switch to the operational heating mode) until the determined temperature reduces to at or below the target temperature.

In some examples, the method of determining temperature T from the parameter r may comprise assuming a relation between T and r, determining a change of r, and from the change of r determining a change in the temperature T.

FIG. 10 represents a single calibration curve, which is representative of a certain susceptor arrangement 110 geometry, material type, and/or relative positioning to the inductive element 158. In some implementations, particularly for implementations where a broadly similar susceptor arrangement 110 is to be used in a device 100, a single calibration curve may be sufficient to account for e.g., manufacturing tolerances. In other words, the error in the temperature measurement (from the determined value of r) may be acceptable to account for various manufacturing tolerances of a single susceptor arrangement 110. Therefore, the control arrangement 106 is configured to perform the operations of determining a value of r followed by determining a value of the temperature T (e.g., using the polynomial curve or look-up table as above).

Figure 11:
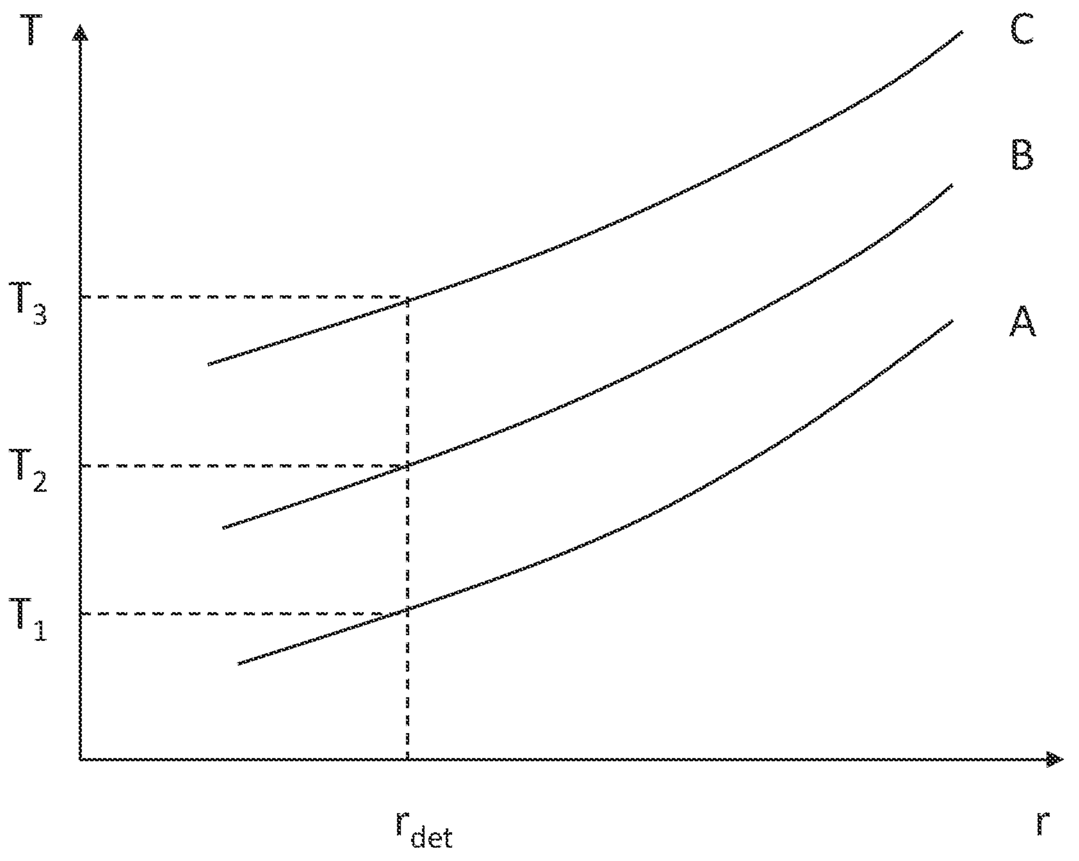
FIG. 11 illustrates a schematic representation of a plurality of plots of susceptor arrangement temperature against parameter r according to an example.

In other examples, and particularly those where a susceptor has a different shape and/or is formed of a different material, different calibration curves (e.g., different third order polynomials) may be required for these different susceptor arrangements 110. FIG. 11 shows a basic representation of a set of three calibration curves, each of which have an associated polynomial function (not shown) fitted thereto. As with FIG. 10, temperature T of the susceptor arrangement 110 is shown on the y-axis while the effective grouped resistance r is shown on the x-axis. Purely by way of example and for illustrative purposes only, curve A may be representative of a stainless steel susceptor, curve B may be representative of an iron susceptor, and curve C may be representative of an aluminum susceptor.

In aerosol generation devices 100 in which different susceptor arrangements 110 can be received and heated, the control circuitry 106 may further be configured to determine which of the calibration curves (e.g., to select from curves A, B or C of FIG. 11) is the correct curve to use for the inserted susceptor arrangement 110. In one example, the aerosol generation device 100 may be fitted with a temperature sensor (not shown) configured to measure a temperature associated with the device 100. In one implementation, the temperature sensor may be configured to detect the temperature of the environment surrounding the device 100 (i.e., the ambient temperature). This temperature may be representative of the temperature of the susceptor arrangement 110 immediately prior to insertion into the device 110, assuming that the susceptor arrangement is not warmed by any other means other than the immediate environment prior to insertion. In other examples, the temperature sensor may be configured to measure the temperature of a chamber configured to receive the consumable 120.

As broadly shown by FIG. 11, a value of r can be determined ($r_{det}$) based on Equation (5). $r_{det}$ is measured either as soon as the susceptor arrangement 110 is placed within the device 100 (if the inductive element 158 is currently active) or as soon as the inductive element 158 is activated (i.e., as soon as a current begins flowing in the circuit 150). That is, $r_{det}$ is preferably determined in the absence of any additional heating caused by energy transfer from the inductive element 158. As seen from FIG. 11, for a given $r_{det}$ there are a plurality of possible temperatures (T1, T2, and T3) each corresponding to a point on one of the calibration curves. In order to distinguish which of the calibration curves is the most appropriate to use for the susceptor arrangement 110 that is currently inserted into the device 100, the control arrangement 106 is configured to firstly determine a value of r (as described above). The control arrangement 106 is configured to obtain/receive a temperature measurement (or an indication of a temperature measurement) from the temperature sensor, and compare the temperature measurement with the temperature values corresponding to a determined r value for each of (or a subset of) the calibration curves. By way of example, and with reference to FIG. 11, if the temperature sensor senses a temperature T equal to T1, then the control arrangement compares the sensed temperature T to the three temperature values T1, T2, T3 corresponding to the determined r value for each calibration curve A, B, and C. Depending on the result of the comparison, the control arrangement sets the calibration curve having the temperature value closest to the measured/sensed temperature value as the calibration curve for that susceptor arrangement 110. In the above example, calibration curve A is set by the control arrangement 106 as the calibration curve for the inserted susceptor 110. Thereafter, each time a value of r is determined by the control arrangement 106, the temperature of the susceptor arrangement 110 is calculated based on the selected calibration curve (curve A). While it has been described above that the calibration curve is selected/set, it should be appreciated that this can mean either that the polynomial equation representing the curve is selected, or the set of calibration values corresponding to the curve, for example in a look-up table, may be selected.

In this regard, the comparison step described above may be implemented according to any suitable comparison algorithm. For example, suppose the sensed temperature t is between T1 and T2. The control arrangement 106 may select either of curve A or curve B depending on the algorithm used. The algorithm may select the curve having the smallest difference (that is, whichever of T2-t or t-T1 is smallest). Other algorithms, such as selecting the greatest value (in this case T2), may be implemented. The principles of the present disclosure are not limited to a particular algorithm in this regard.

In addition, the control arrangement 106 may be configured to repeat the process for determining the calibration curve in certain conditions. For example, each time the device is powered up, the control arrangement 106 may be configured to repeat the process of identifying the appropriate curve at the appropriate time (for instance when the inductive element 158 is first supplied with current). In this regard, the device 100 may have several modes of operation, such as an initial power on state, where power from the battery is supplied to the control arrangement 106 (but not to the resonant circuit 150). This state may be transition to through a user pushing a button on the surface of the device 100 for example. The device 100 may also have an aerosol-generating mode where power is additionally supplied to the resonant circuit 150. This may be activated either through a button or a puff sensor (as described above). Hence, the control arrangement 106 may be configured to repeat the process for selecting the appropriate calibration curve when the aerosol-generating mode is first selected. Alternatively, the control arrangement 106 may be configured to determine when a susceptor arrangement is removed (or inserted into) the device 100 and is configured to repeat the process for determining the calibration curve at the next appropriate opportunity.

While it has been described above that the control arrangement makes use of Equations 4a and 5, it should be appreciated that other equations achieving the same or similar effect may be used in accordance with the principles of the present disclosure. In one example, $R_{dyn}$ can be calculated based on the AC values of the current and voltage in the circuit 150. For example, the voltage at node A can be measured and, it has been found that this is different from $V_s$—we call this voltage VAC. VAC can be measured practically by any suitable means but is the AC voltage within the parallel LC loop. Using this, one can determine an AC current, IAC, by equating the AC and DC power. That is, $V_{AC}I_{AC}=V_SI_S$. The parameters $V_s$ and $I_s$ can be substituted with their AC equivalents in Equation 5, or any other suitable equation for the parameter r. It should be appreciated that a different set of calibration curves may be realized in this case.

While the above description has described the operation of the temperature measurement concept in the context of the circuit 150 which is configured to self-drive at the resonant frequency, the above described concepts are also applicable to an induction heating circuit which is not configured to be driven at the resonant frequency. For example, the above-described method of determining the temperature of a susceptor may be employed with an induction heating circuit which is driven at a predetermined frequency, which may not be the resonant frequency of the circuit. In one such example, the induction heating circuit may be driven via an H-Bridge, comprising a switching mechanism such as a plurality of MOSFETs. The H-Bridge may be controlled, via a microcontroller or the like to use a DC voltage to supply an alternating current to the inductor coil at a switching frequency of the H-Bridge, set by the microcontroller. In such an example, the above relations set out in equations (1) to (5) are assumed to hold and provide a valid, e.g. usable, estimate of the temperature T for frequencies in a range of frequencies including the resonant frequency. In an example, the above-described method may be used to obtain a calibration between the parameter r and the temperature T at the resonant frequency and the same calibration then used to relate r and T when the circuit is not driven at resonance. However, it should be appreciated that the derivation of Equation 5 assumes that the circuit 150 operates at a resonant frequency $f_0$. Therefore, it is likely that the error associated with the determined temperature increases with an increasing difference between the resonant frequency $f_0$ and the pre-determined drive frequency. In other words, a temperature measurement with a greater accuracy can be determined when the circuit is driven at, or close to, the resonant frequency. For example, the above method of relating and determining r and T may be used for frequencies within a range $f_0-\Delta f$ to $f_0+\Delta f$, where $\Delta f$ may, for example, be determined experimentally by measuring the temperature of the susceptor T directly and testing the above derived relationships. For example, larger values of $\Delta f$ may provide lower accuracy in the determination of the temperature T of the susceptor but may still be usable.

In some examples, the method may comprise assigning $V_s$ and $I_s$ constant values and assuming that these values do not change in calculating the parameter r. The voltage $V_s$ and the current $I_s$ may then need not be measured in order to estimate the temperature of the susceptor. For example, the voltage and current may be approximately known from the properties of the power source and the circuit, e.g. the configuration of the voltage regulator 150 and the voltage signal input to the voltage regulator, and may be assumed to be constant over the range of temperatures used. In such examples, the temperature T may then be estimated by measuring only the frequency at which the circuit is operating, and using assumed or previously measured values for the voltage and current. The invention thus may provide for a method of determining the temperature of the susceptor by measuring the frequency of operation of the circuit. In some implementations, the invention thus may provide for a method of determining the temperature of the susceptor by only measuring the frequency of operation of the circuit.

In another example, circuitry for the aerosol generating device 100 comprises a heating circuit for heating the susceptor arrangement, a temperature sensing circuit for inductively imparting energy to the susceptor arrangement without substantially heating the susceptor arrangement, and a temperature determiner for determining a temperature of the susceptor arrangement based on one or more electrical properties of the temperature sensing circuit.

Figure 12:
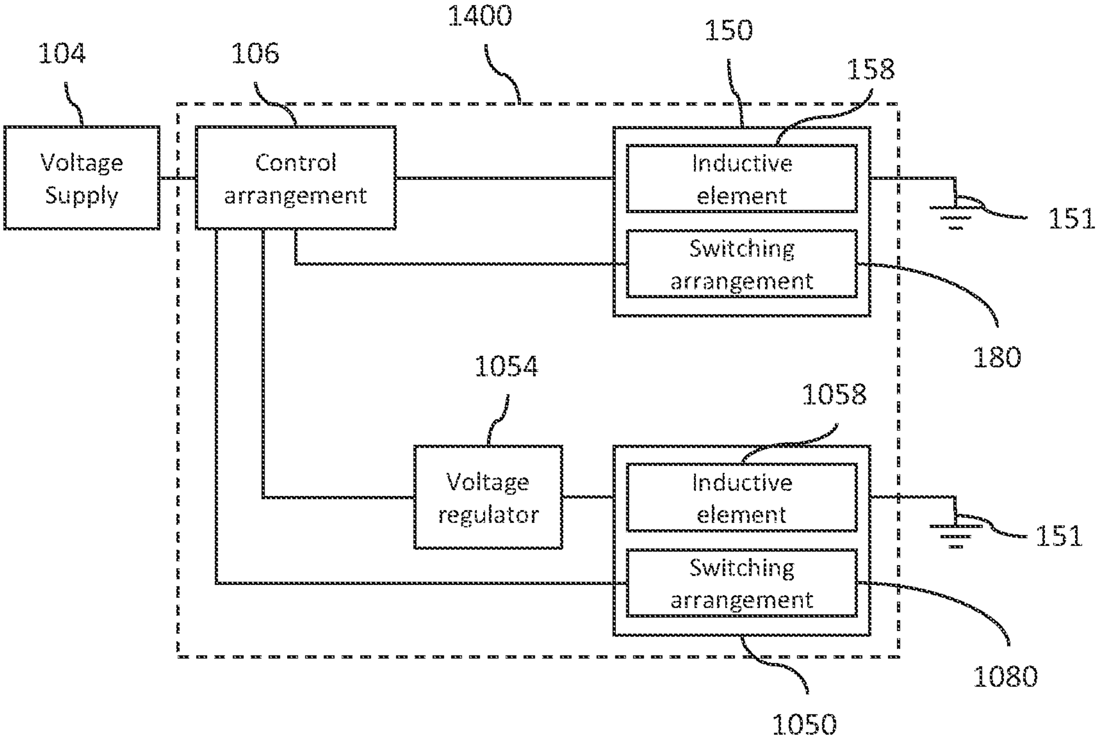
FIG. 12 illustrates schematically aspects of circuitry of the aerosol-generating device according to another example.

FIG. 12 shows such an example, wherein the voltage supply 104 supplies circuitry 1400, comprising the control arrangement 106 and heating circuit 150 and, in addition, a temperature sensing circuit 1050. The heating circuit 150 in the circuitry 1400 may have any of the features described above with reference to earlier figures and operates in the way described above to inductively heat the susceptor arrangement 110. Description of the heating circuit 150 will not be repeated here.

In this example, the control arrangement 106 is operable to operate the circuitry 1400 selectively in each of: an operational mode, wherein the heating circuit 150 is operated to heat the susceptor arrangement 110 to generate an aerosol; and a temperature sensing mode, wherein the temperature sensing circuit 1050 is operable to determine a temperature of the susceptor arrangement 110 without significantly heating the susceptor arrangement 110.

An input voltage to the temperature sensing circuit 1050 is, in this example, supplied by a voltage regulator 1054. The voltage regulator 1054 may have any of the features described above with reference to the voltage regulator 154 of earlier examples. The voltage regulator 1054 in this example operates to supply a fixed low voltage to the temperature sensing circuit to allow the temperature sensing circuit to inductively impart energy to the susceptor arrangement 110 without significantly heating the susceptor arrangement 110.

The temperature sensing circuit 1050 comprises an inductive element 1058 and a switching arrangement 1080. In the manner described above with reference to earlier examples, the switching arrangement 1080 operates to cause a varying current to pass through the inductive element 1058 and this causes energy to be inductively imparted to the susceptor arrangement 110. The temperature sensing circuit 1050, and its components the inductive element 1058 and the switching arrangement 1080, may have any of the features described above for the heating circuit 150 and its corresponding components.

In the example of FIG. 12, the heating circuit 150 may be operable only when it is desired to heat the susceptor arrangement 110. Since there is no need for the heating circuit 150 to operate in a temperature-sensing mode in this arrangement, the voltage regulator 154 may be omitted. Omitting the voltage regulator 154 from the supply to the heating circuit 150 could provide for lower losses and higher efficiency when it is desired to heat the susceptor arrangement 110. For example, the heating circuit 150 may be supplied with the raw battery voltage. Alternatively, the voltage regulator 154 described with reference to earlier examples could be included in the supply to the heating circuit 150 to allow the heating power of the circuit 150 to be controlled. This may also take account of a depleting voltage supply (e.g., battery) output such that a regulated (and in some instances constant) voltage is supplied to the inductive element 158. Alternatively, a variable voltage regulator (i.e., a voltage regulator which can be controlled to output two or more different voltages) can be positioned between the voltage supply and the control arrangement 106 (or integrated with the control arrangement) instead of voltage regulator 154 and 1054 and is selectively controlled to supply the desired regulated voltage to the inductive element 158 or 1058 depending on the mode of operation.

In the temperature-sensing mode, the temperature sensing circuit 1050 is configured to impart less energy to the susceptor arrangement 110 than the heating circuit 150 in the operational heating mode. The temperature sensing circuit 1050 may therefore be supplied with a lower voltage than the heating circuit 150, for example if the electrical properties of the temperature sensing circuit and the heating circuit are similar. In general, the temperature sensing circuit 1050 may have different properties than the heating circuit, for example, the inductive element 1058 of the temperature sensing circuit 1050 may have a different inductance than the inductive element 158 of the heating circuit 150. Accordingly, the temperature sensing circuit 1050 may be supplied, in the temperature-sensing mode, with any suitable voltage to achieve the effect of imparting energy to the susceptor arrangement 110 to allow the temperature of the susceptor arrangement to be determined without significantly heating the susceptor arrangement 110.

In the temperature-sensing mode, the temperature of the susceptor arrangement 110 may be determined from one or more electrical properties of the temperature sensing circuit 1050. This may be done in any of the ways described above with reference to earlier examples wherein the heating circuit 150 operates in a temperature-sensing mode.

In examples such as that shown in FIG. 12, wherein a separate heating circuit is used, there may be no need to monitor parameters such as the operating frequency, voltage and/or current in the heating circuit 150. This may simplify the circuitry used in the device 100. Further, as mentioned above, there may be no need to regulate the voltage supplied to the heating circuit 150, which may allow for losses to be reduced.

The control arrangement 106 may, for example, operate the control scheme described above wherein the proportion of the time in which the circuitry 1400 is operated in the operational heating mode versus the proportion of time the circuitry 1400 is operated in the temperature sensing mode is dependent on a difference between the determined temperature and a target temperature for the susceptor arrangement 110.

While some examples described above include a circuit which is configured to self-drive at its resonant frequency, the above-described concepts are also applicable to an induction heating circuit, which is not configured to be driven at the resonant frequency. For example, the above-described principles may be employed in an induction heating circuit which is driven at a predetermined frequency, which may not be the resonant frequency of the circuit. In one such example, the induction heating circuit may be driven via an H-Bridge, comprising a switching mechanism such as a plurality of MOSFETs. The H-Bridge may be controlled, via a microcontroller or the like to use a DC voltage to supply an alternating current to the inductor coil at a switching frequency of the H-Bridge, set by the microcontroller.

Although in the examples described above the voltage regulator is a buck regulator configured to step down the voltage from the DC voltage supply, in other examples, the voltage regulator may be a boost regulator which is configured to output a voltage greater than the output voltage of the DC voltage supply, i.e. to step up the voltage. This type of voltage regulator may be referred to as a boost regulator. In yet other examples, the voltage regulator may be configured to provide functionality for both stepping up the voltage and for stepping down the voltage, i.e. the voltage regulator may be controllable to output a range of voltages less than and greater than the input voltage from the voltage supply. This type of voltage regulator may be referred to as buck/boost regulator, or a buck/boost converter.

Certain examples described herein may form a "delivery system" or part of a delivery system. In certain examples a delivery system may be a "non-combustible" aerosol provision system, which also may be referred to as a non-combustible aerosol generating system. According to the present disclosure, a non-combustible aerosol provision system is one where a constituent aerosol-generating material of the aerosol provision system (or component thereof) is not combusted or burned in order to facilitate delivery of at least one substance to a user.

In some examples, the non-combustible aerosol provision system is an electronic cigarette, also known as a vaping device or electronic nicotine delivery system (END), although it is noted that the presence of nicotine in the aerosol-generating material is not a requirement.

In some examples, the non-combustible aerosol provision system is an aerosol-generating material heating system, also known as a heat-not-burn system. An example of such a system is a tobacco heating system.

In some examples, the non-combustible aerosol provision system is a hybrid system to generate aerosol using a combination of aerosol-generating materials, one or a plurality of which may be heated. Each of the aerosol-generating materials may be, for example, in the form of a solid, liquid or gel and may or may not contain nicotine. In some examples, the hybrid system comprises a liquid or gel aerosol-generating material and a solid aerosol-generating material. The solid aerosol-generating material may comprise, for example, tobacco or a non-tobacco product.

Typically, the non-combustible aerosol provision system may comprise a non-combustible aerosol provision device and a consumable for use with the non-combustible aerosol provision device.

As above, an aerosol provision system may be referred to herein as an aerosol generating system and, further, an aerosol provision device may be referred to herein as an aerosol generating device.

In some examples, the disclosure relates to consumables comprising aerosol-generating material and configured to be used with non-combustible aerosol provision devices. These consumables are sometimes referred to as articles or aerosol generating articles throughout the disclosure.

In some examples, the non-combustible aerosol provision system may comprise an area for receiving the consumable, an aerosol generator, an aerosol generation area, a housing, a mouthpiece, a filter and/or an aerosol-modifying agent.

In some examples, the consumable for use with the non-combustible aerosol provision device may comprise aerosol-generating material, an aerosol-generating material storage area, an aerosol-generating material transfer component, an aerosol generator, an aerosol generation area, a housing, a wrapper, a filter, a mouthpiece, and/or an aerosol-modifying agent.

In some examples, the substance to be delivered may be an aerosol-generating material or a material that is not intended to be aerosolized. As appropriate, either material may comprise one or more active constituents, one or more flavors, one or more aerosol-former materials, and/or one or more other functional materials.

Aerosol-generating material is a material that is capable of generating aerosol, for example when heated, irradiated or energized in any other way. Aerosol-generating material may, for example, be in the form of a solid, liquid or gel which may or may not contain an active substance and/or flavorants. In some examples, the aerosol-generating material may comprise an "amorphous solid", which may alternatively be referred to as a "monolithic solid" (i.e. non-fibrous). In some examples, the amorphous solid may be a dried gel. The amorphous solid is a solid material that may retain some fluid, such as liquid, within it. In some examples, the aerosol-generating material may for example comprise from about 50 wt %, 60 wt % or 70 wt % of amorphous solid, to about 90 wt %, 95 wt % or 100 wt % of amorphous solid.

The aerosol-generating material may comprise one or more active substances and/or flavors, one or more aerosol-former materials, and optionally one or more other functional material.

The material may be present on or in a support, to form a substrate. The support may, for example, be or comprise paper, card, paperboard, cardboard, reconstituted material, a plastics material, a ceramic material, a composite material, glass, a metal, or a metal alloy. In some examples, the support comprises a susceptor. In some examples, the susceptor is embedded within the material. In some alternative examples, the susceptor is on one or either side of the material.

A consumable is an article comprising or consisting of aerosol-generating material, part or all of which is intended to be consumed during use by a user. A consumable may comprise one or more other components, such as an aerosol-generating material storage area, an aerosol-generating material transfer component, an aerosol generation area, a housing, a wrapper, a mouthpiece, a filter and/or an aerosol-modifying agent. A consumable may also comprise an aerosol generator, such as a heater, that emits heat to cause the aerosol-generating material to generate aerosol in use. The heater may, for example, comprise combustible material, a material heatable by electrical conduction, or a susceptor.

A susceptor is a material that is heatable by penetration with a varying magnetic field, such as an alternating magnetic field. The susceptor may be an electrically-conductive material, so that penetration thereof with a varying magnetic field causes induction heating of the heating material. The heating material may be magnetic material, so that penetration thereof with a varying magnetic field causes magnetic hysteresis heating of the heating material. The susceptor may be both electrically-conductive and magnetic, so that the susceptor is heatable by both heating mechanisms. The device that is configured to generate the varying magnetic field is referred to as an inductive element herein but may also be referred to as a magnetic field generator.

An aerosol generator is an apparatus configured to cause aerosol to be generated from the aerosol-generating material. In examples of the present disclosure, the aerosol generator is configured to subject the aerosol-generating material to heat energy, so as to release one or more volatiles from the aerosol-generating material to form an aerosol.

The above examples are to be understood as illustrative examples of the disclosure. It is to be understood that any feature described in relation to any one example may be used alone, or in combination with other features described, and may also be used in combination with one or more features of any other of the examples, or any combination of any other of the other examples. Furthermore, equivalents and modifications not described above may also be employed without departing from the scope of the invention, which is defined in the accompanying claims.

The invention claimed is:

1. Apparatus for an aerosol generating device, the apparatus comprising:

a heating circuit comprising an inductive element for inductively heating a susceptor arrangement to heat an aerosol generating material to thereby generate an aerosol;

a temperature determiner for determining a temperature of the susceptor arrangement based on one or more electrical properties of the heating circuit influenced by the temperature of the susceptor arrangement; and a control arrangement configured to cause the heating circuit to operate in:

an operational mode in which the heating circuit is supplied with a first voltage to inductively heat the susceptor arrangement to generate an aerosol for inhalation by a user; and a temperature determination mode in which the heating circuit is supplied with a continuous second voltage which is different to the first voltage, wherein in the temperature determination mode the heating circuit is configured to impart energy via induction to the heating circuit without significantly heating the susceptor arrangement and the temperature determiner is configured to determine the temperature of the susceptor arrangement based on the one or more electrical properties of the heating circuit wherein the temperature determiner is configured to, in the temperature determination mode, determine a temperature of the susceptor arrangement based on a frequency that the heating circuit is being operated at and a DC current drawn by the heating circuit.

2. The apparatus according to claim 1, wherein the one or more electrical properties of the heating circuit comprise a frequency at which the circuit is operating and/or a current drawn by the heating circuit and/or an impedance of the heating circuit.

3. The apparatus according to claim 1, wherein the second voltage is a substantially constant DC voltage.

4. The apparatus according to claim 1, comprising a voltage regulator, wherein the voltage regulator is operable to cause the second voltage to be supplied to the heating circuit in the temperature determination mode and/or the first voltage to be supplied to the heating circuit in the operational mode.

5. The apparatus according to claim 4, wherein in the operational mode the voltage supplied to the heating circuit is not regulated by the voltage regulator.

6. The apparatus according to claim 4, wherein the voltage regulator is configured to allow an input voltage from a DC voltage supply to be stepped down to output a DC voltage across the heating circuit which has a lower magnitude than the input voltage.

7. The apparatus according to claim 4, wherein the control arrangement is configured to control the voltage output by the voltage regulator by controlling a property of an input voltage from a DC voltage supply to the voltage regulator.

8. The apparatus according to claim 7, wherein the property of the input voltage from the DC voltage supply to the voltage regulator is a duty cycle of the input voltage.

9. The apparatus according to claim 1, wherein the heating circuit is a resonant LC circuit.

10. The apparatus according to claim 9, wherein the heating circuit is a parallel LC circuit comprising a capacitive element arranged in parallel with the inductive element.

11. The apparatus according to claim 9, wherein the LC resonant circuit is configured to operate at a resonant frequency of the LC resonant circuit to heat the susceptor arrangement.

12. The apparatus according to claim 11, wherein a switching arrangement is configured to alternate between a first state and a second state to cause a varying current through the inductive element, and wherein the switching arrangement is configured to alternate between the first state and the second state in response to voltage oscillations within the resonant circuit.

13. The apparatus according to claim 12, wherein the voltage oscillations within the resonant circuit act to cause the alternating of the switching arrangement between the first state and the second state to thereby cause the current through the inductive element to vary at the resonant frequency of the resonant circuit.

14. The apparatus according to claim 1, wherein the second voltage is lower than the first voltage.

15. The apparatus according to claim 1, wherein the temperature determiner is configured to, in the temperature determination mode, determine a temperature of the susceptor arrangement based on, in addition to the frequency that the heating circuit is being operated at and the DC current drawn by the heating circuit, the second voltage supplied to the circuit.

16. The apparatus according to claim 1, wherein the temperature determiner is configured to, in the temperature determination mode:

determine an effective grouped resistance of the inductive element and the susceptor arrangement from the frequency that the heating circuit is being operated at, the DC current drawn by the heating circuit and the second voltage; and determine the temperature of the susceptor arrangement based on the determined effective grouped resistance.

17. An aerosol generating device comprising the apparatus according to claim 1.

18. An aerosol generating system comprising the aerosol generating device according to claim 17 and a susceptor arrangement arranged to be heated by a first inductive element to thereby heat the aerosol generating material to generate a flow of aerosol and arranged to be inductively coupled to a second inductive element such that the temperature determiner can be operated to determine a temperature of the susceptor arrangement.

19. The aerosol generating system of claim 18, wherein the susceptor arrangement is provided in a component separate from, and configured to releasably engage with, the aerosol provision device.

20. A method of operating an aerosol generating system comprising an aerosol generating device and a susceptor arrangement arranged to be heated by the aerosol generating device to heat aerosol generating material to generate a flow of aerosol, wherein the aerosol generating device comprises:

a heating circuit comprising an inductive element for inductively heating the susceptor arrangement to heat the aerosol generating material to thereby generate an aerosol;

a temperature determiner for determining a temperature of the susceptor arrangement based on one or more electrical properties of the heating circuit influenced by the temperature of the susceptor arrangement; and a control arrangement; and wherein the method comprises:

controlling, by the control arrangement, the apparatus to selectively operate in:

an operational mode in which the heating circuit is supplied with a first voltage to inductively heat the susceptor arrangement to generate an aerosol for inhalation by a user; and a temperature determination mode in which the heating circuit is supplied with a continuous second voltage which is different to the first voltage, wherein in the temperature determination mode the heating circuit is configured to impart energy via induction to the heating circuit without significantly heating the susceptor arrangement and the temperature determiner is configured to determine the temperature of the susceptor arrangement based on the one or more electrical properties of the heating circuit, wherein in the temperature determination mode, the temperature determiner is configured to determine a temperature of the susceptor arrangement based on a frequency that the heating circuit is being operated at and a DC current drawn by the heating circuit.

* * * * *